US011822770B1

(12) United States Patent
Antos et al.

(10) Patent No.: US 11,822,770 B1
(45) Date of Patent: Nov. 21, 2023

(54) INPUT-BASED DEVICE OPERATION MODE MANAGEMENT

(71) Applicant: Amazon Technologies, Inc., Seattle, WA (US)

(72) Inventors: Kynan Dylan Antos, Seattle, WA (US); Jenny Toi Wah Lam, Bainbridge Island, WA (US); Mark Yoshitake, Palo Alto, CA (US); Ankur Narendra Bhai Vachhani, San Jose, CA (US); Blade Imsande McRae, Seattle, WA (US); Robert Williams, San Francisco, CA (US); James Martin Conway, Pleasanton, CA (US); Nedim Fresko, Seattle, WA (US); Michael Wendling, Woodside, CA (US); Mustafa Husain, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/106,530

(22) Filed: Nov. 30, 2020

Related U.S. Application Data

(63) Continuation of application No. 15/921,233, filed on Mar. 14, 2018, now Pat. No. 10,877,637.

(51) Int. Cl.
| | | |
|---|---|---|
| *G06F 3/048* | (2013.01) | |
| *G06F 3/0484* | (2022.01) | |
| *G06F 3/16* | (2006.01) | |
| *G10L 15/08* | (2006.01) | |
| *G06F 3/0481* | (2022.01) | |
| *G10L 15/22* | (2006.01) | |
| *G06F 3/04883* | (2022.01) | |

(52) U.S. Cl.
CPC .......... *G06F 3/0484* (2013.01); *G06F 3/0481* (2013.01); *G06F 3/04883* (2013.01); *G06F 3/167* (2013.01); *G10L 15/08* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,424,431 B2 | 9/2008 | Greene et al. | |
| 8,254,992 B1 * | 8/2012 | Ashenbrenner | G06F 1/1632 455/557 |

(Continued)

*Primary Examiner* — William C Trapanese
(74) *Attorney, Agent, or Firm* — Eversheds Sutherland (US) LLP

(57) ABSTRACT

Systems, methods, and computer-readable media are disclosed for systems and methods for voice-based device operation mode management. Example methods may include determining that a device is coupled to an accessory device, and determining that being coupled to the accessory device triggers activation of a first operation mode at the device. The first operation mode presents digital content at the display in a user interface having a first content density that is less than a second content density of a second operation mode. Example methods may include causing the device to activate the first operation mode, receiving first voice data indicative of a request to change the device operation mode to the second operation mode, and causing the device to activate the second operation mode.

20 Claims, 19 Drawing Sheets

(56) References Cited

U.S. PATENT DOCUMENTS

| | | |
|---|---|---|
| 8,924,219 B1 | 12/2014 | Bringert et al. |
| 9,110,556 B2 | 8/2015 | Kozitsyn et al. |
| 9,619,200 B2 | 4/2017 | Chakladar et al. |
| 9,633,661 B1 | 4/2017 | Typrin et al. |
| 9,990,922 B2 | 6/2018 | Foerster et al. |
| 10,074,371 B1 | 9/2018 | Wang et al. |
| 10,282,166 B2 | 5/2019 | Fountaine |
| 10,475,449 B2 | 11/2019 | Lang |
| 10,877,637 B1 | 12/2020 | Antos et al. |
| 10,885,910 B1 | 1/2021 | Antos et al. |
| 2010/0173672 A1 | 7/2010 | Kuhl et al. |
| 2011/0099316 A1* | 4/2011 | Tseng ............... G06F 16/638 710/304 |
| 2011/0237220 A1* | 9/2011 | Matsuoka ......... H04M 1/72463 455/411 |
| 2012/0001843 A1* | 1/2012 | Gravino ............... G06F 1/1694 345/156 |
| 2012/0030393 A1 | 2/2012 | Ganesh et al. |
| 2012/0035931 A1 | 2/2012 | LeBeau et al. |
| 2012/0176313 A1* | 7/2012 | Ryu .................... G10L 15/26 345/158 |
| 2012/0245941 A1 | 9/2012 | Cheyer |
| 2013/0085755 A1 | 4/2013 | Bringert et al. |
| 2013/0166790 A1* | 6/2013 | Lee ........................ G06F 13/10 710/17 |
| 2013/0325479 A1* | 12/2013 | Krueger ................ G10L 21/00 704/275 |
| 2014/0189801 A1* | 7/2014 | Rokusek ................ G06F 21/00 726/4 |
| 2016/0019889 A1 | 1/2016 | Alvarez Guevara et al. |
| 2016/0189328 A1* | 6/2016 | Vranjes ............. G06F 3/04886 345/173 |
| 2017/0032784 A1 | 2/2017 | Dadu et al. |
| 2017/0245076 A1 | 8/2017 | Kusano et al. |
| 2017/0345420 A1 | 11/2017 | Barnett, Jr. |
| 2017/0358317 A1 | 12/2017 | James |
| 2018/0054695 A1 | 2/2018 | Castor et al. |
| 2018/0096690 A1 | 4/2018 | Mixter et al. |
| 2018/0295405 A1 | 10/2018 | Barnett, Jr. et al. |
| 2018/0301151 A1 | 10/2018 | Mont-Reynaud et al. |
| 2019/0095990 A1* | 3/2019 | Sarir ..................... G06Q 40/02 |
| 2019/0272831 A1 | 9/2019 | Kajarekar |

\* cited by examiner

INPUT-BASED DEVICE OPERATION MODE MANAGEMENT

CROSS REFERENCE TO RELATED APPLICATION(S)

This application is a continuation of U.S. application Ser. No. 15/921,233 filed Mar. 14, 2018, the disclosure of which is incorporated by reference in its entirety.

BACKGROUND

Electronic devices, such as smartphones, tablets, computers, and so forth may be used by users to consume digital content, play games, request information, and the like. Users may interact with devices via controls, touch inputs, and, in some instances, voice commands. Users may desire interacting with such devices in different manners at different times. However, changing an interaction mode of a device may be cumbersome or inconvenient.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
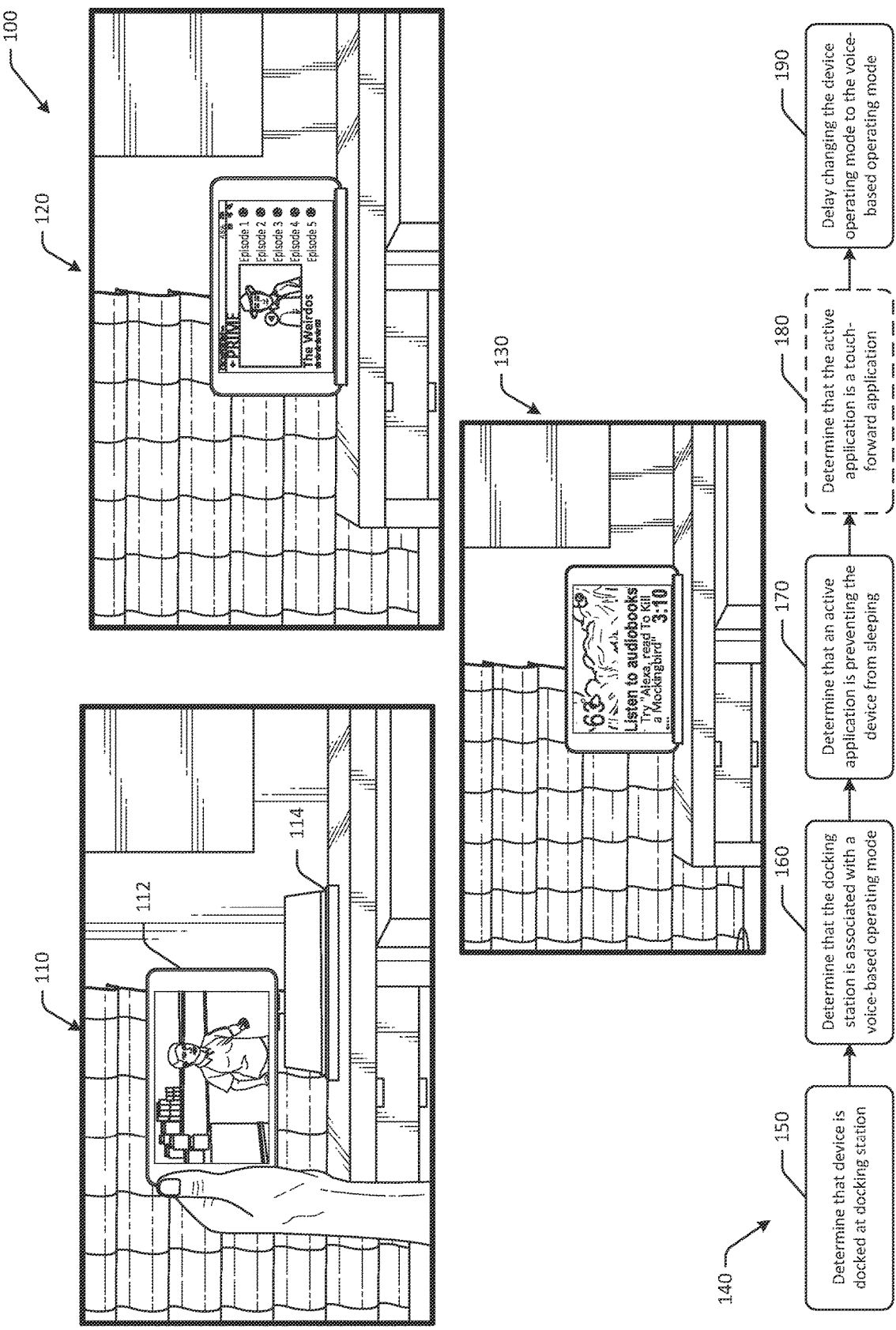
FIG. 1 is a schematic illustration of an example use case for voice-forward graphical user interface mode management in accordance with one or more example embodiments of the disclosure.

Electronic devices, such as tablets, smartphones, computers, and the like may be configured to operate in different device operation modes. Device operation modes may include, for example, touch-forward operation modes, voice-forward operation modes, user-presence based operation modes, and other operation modes. Operation modes may dictate or be associated with visual displays and/or user interfaces that are presented at a device. For example, a tablet operation mode may present an application user interface or another user interface, such as a home screen or operating system interface, in a first configuration, and a voice-forward operation mode may present the application user interface or other user interface in a second configuration that is different than the first configuration. Differences between user interfaces presented in different operation modes may include differences in content layout or arrangement, differences in an amount of content presented or a content and/or information density, differences in available options that are presented at the device, and the like. For example, a user interface presented in a touch-forward operation mode may have more information or content, or a higher information or content density, than a user interface presented in a voice-forward operation mode.

A touch-forward or touch-based operation mode of a device may be a mode where the user experience with the device is optimized for touch input, or is touch-forward. As a result, this may indicate that the user is physically in proximity to the device, so as to provide touch inputs. The touch-forward operation mode may therefore use smaller fonts, include more options or selections, present more information or have a relatively higher content density than other modes, and so forth since the user may be physically close to the device (e.g., holding the device, etc.). This may be because the user is physically closer to the device, and can more easily consume information and/or provide inputs. Voice inputs may complement touch-forward operation modes. In touch-forward operation mode, voice commands can still be used to interact with the device (e.g., "play that one"). In touch-forward operation mode, an overall experience may be optimized for touch inputs.

In contrast, a voice-forward or voice-based operation mode of a device may be a mode where the user experience with the device is optimized for voice input, or is voice forward. As a result, the user may be able to interact with the device from a greater distance, since the user may not have to touch the device in order to make an input at the device. For example, a user in a kitchen environment may have wet hands and may not want to touch the device, and may therefore interact with the device via voice. In addition, because the user may be further away from the device, user interface fonts may be relatively larger, and any selectable elements, if any, may be less in number than in a touch-forward operation mode. The content density may be reduced, so as to improve readability or consumption from a greater distance than, for example, content presented in the touch-forward operation mode. The voice-forward operation mode may therefore be different from the touch-forward operation mode and may encourage voice-forward interactions with the device, such as by providing voice hints (e.g., "say show me the recipe," etc.). Touch inputs may complement voice-forward operation modes. In voice-forward operation mode, touch inputs can still be used to control the device. In voice-forward operation mode, an overall experience may be optimized for voice inputs.

Embodiments of the disclosure include systems and methods for application-based device operation mode management and/or voice-forward graphical user interface mode management. Certain embodiments may use application settings and/or device settings to manage changes to the operating mode of a device. As a result, user experiences with the device may be improved by avoiding interruption to content that a user may be consuming, and automatically shifting device operation modes based on likely user interactions with the device. Some embodiments may be configured to change device operation modes based on voice inputs or voice commands, and may be configured to change operation modes based on applications that are openly responsive to voice commands. In some embodiments, password protections on a device may be bypassed as a result of a voice input from a speaker or user that is likely to be authorized to access the device. As a result, a user can interact with the device using voice, rather than having to physically approach the device and input a password.

This disclosure relates to, among other things, devices, systems, methods, computer-readable media, techniques, and methodologies for voice-forward graphical user interface mode management. Certain embodiments manage changes to operation modes of device, for example, by deferring an operation mode change, canceling an operation mode change, overriding an operation mode change, and other management. Some embodiments may use application settings, such as settings that prevent a computer processor or device display from sleeping, to determine whether to implement a device operation mode change. Some embodiments may determine whether a device operation mode is to be implemented based on availability of different versions of application interfaces (e.g., voice-forward versions, touch-forward versions, etc.) and/or the availability of a related remote application (e.g., skills that can be enabled at remote servers, etc.). Certain embodiments may use voice data to determine whether to prompt a user for a password before presenting certain information to the user at a device. Certain embodiments may determine content being presented at a device, as well as a current function of a device, in order to determine whether to switch a device operation mode.

Some embodiments of the disclosure may leverage a wake-lock or other application setting of an application or operating system to determine whether a device operating mode or operation mode is to be modified. For example, a tablet may be configured to operate in a touch-forward operation mode and a voice-forward operation mode. Handling changes in mode may be based on an application that is running at the time a mode change is to occur. For example, when the tablet is docked, a mode change from the touch-forward mode to the voice-forward mode may normally occur, but because of a specific application running at the time of docking, the mode change may be deferred or canceled, so as to reduce interruptions to application related content that a user may be consuming.

Certain embodiments may use voice-forward commands to change device operation modes without physical user interaction with the device. As a result, users can change the configuration and density of content presented at a device from a distance, and may not have to undock the device or manually change a device operation mode. Certain embodiments may manage when passwords or codes are needed to access certain data on devices. For example, a user may be interacting with a tablet or other device using voice commands, and may request that a certain application, such as a calendar, be opened. Embodiments may determine whether the user will have to enter a passcode at the device, for example, based on a likelihood that the user is authorized to access the device or application, the type of application or data being requested, and/or the like. The user experience with the device may therefore be improved by not requiring a user to enter a passcode to access data or content the user is authorized to access.

Referring to FIG. 1, an example use case 100 for voice-forward graphical user interface mode management is depicted in accordance with one or more example embodiments of the disclosure. In FIG. 1, at a first instance 110, a user may be using a device 112 to consume video content. The video content may be optionally presented in a full screen view or format. For example, the user may be consuming a movie, television show, or other digital content. The device 112 may be operating in a touch-forward operation mode at the first instance 100, as the user is holding the device and/or may have navigated to the video using touch-forward inputs.

The user may place the device 112 at a docking station 114 or other accessory device, such as a charging device to charge the device, for example, or to set the device in an upright position so that the device no longer needs to be held by the user. Accessory devices may include non-power providing devices, such as device stands or cradles.

At a second instance 120, the device 112 may be docked at the docking station 114. When the device 112 is connected to the docking station 114 under usual circumstances, the device 112 may automatically convert or switch from the touch-forward operation mode to a voice-forward operation mode, so that the user does not have to remain in physical proximity to the device while it is docked and/or charging. In a docked operation mode, which may be a voice-forward operation mode in some embodiments, the device may be in an always on, always listening, and always powered configuration.

However, because the user was consuming video content in a full screen mode, the device 112 may postpone or defer the automatic change in operation status that was supposed to occur when connecting to the docking station 114. This is because the user may still be consuming the video content, and may not desire to be interrupted with a change to the device operation mode. In some instances, video playback may be interrupted when connected to an accessory device or a docking station unless the video is being played in a full screen mode, so as to avoid preventing a change in operation mode as a result of inline advertisement videos or other videos being presented at the device. In instances where audio content is being presented, such as music, a device operation mode may be changed, but playback of the audio content may continue uninterrupted, so as to avoid negatively impacting a user experience of the device. In other instances, the device operation mode may not be changed while audio in being presented in a background environment.

After the device 112 is docked at the docking station 114 and the video content completes playback, the device 112 may return to the application interface for the application that was used to present the video content, as illustrated at the second instance 120.

In some embodiments, an optional timeout period may be determined to elapse after the application interface is presented and/or after playback of the video content is complete. The device 112 may remain in the touch-forward operation mode (or whatever the previous operation mode was) during the timeout period so as to allow the user to interact with the application using touch-forward inputs.

After the timeout period has elapsed, the device 112 may change to a voice-forward operation mode, as illustrated at a third instance 130. The device 112 may therefore present a user interface associated with the voice-forward operation mode. For example, the user interface may include voice hints, user-specific information, and/or other content. In some embodiments, the user interface may include an ambient clock and/or other content.

To manage changes to the operation mode of the device 112, an example process flow 140 is presented and may be performed, for example, by one or more remote servers or at a device locally. The remote server and/or device may include at least one memory that stores computer-executable instructions and at least one processor configured to access the at least one memory and execute the computer-executable instructions to perform various actions or operations, such as one or more of the operations in a process flow 140 of FIG. 1.

At a first block 150, it may be determined that a device is docked at a docking station. The device 112, for example, may determine that a connector of the docking station 114 or the device 112 is coupled to a connector or connector port of a connected device. A coupling can include a connection or any other means by which devices are physically and/or communicatively coupled. The connected device may be identified as the docking station 114. The device 112 or a remote server may determine, for example using a settings database, that a connection to the docking station 114 causes an active user interface theme of the device to be set to a voice-forward user interface theme or operation mode. The voice-forward user interface may present digital content at the display in a visual format or application interface having a first content density. The content density may be relatively less than a content density of user interfaces configured for touch-forward operation modes, because the user may be consuming the content from a greater distance.

In some embodiments, the device may be physically coupled to an accessory, such as a case or a bumper, which is used to interface with the accessory device and/or docking station. For example, the accessory may be coupled to an input/output and/or charging port of the charging device. The accessory may optionally include circuitry and/or an input/output or charging port that couples with the docking station. In other embodiments, the device may not be docked at a docking station, but could be coupled to any power-providing or other accessory device, such as a power cord, charging mat, and the like.

Certain embodiments may not need to be coupled to charging devices, and may instead have operation modes that are associated with certain orientation or positions of the device. For example, if it is determined that the device is leaning against a stand or a wall, or another accessory device, the device may switch operation modes. In some embodiments, if it is determined (e.g., via feedback from one or more accelerometers, gyroscopes, and/or other sensors, etc.) that the device is in a certain position, a device operation mode may be changed. For example, leaning the device against a wall, lamp, or other structure, as determined by one or more motion sensors for a certain length of time, may cause the device operation mode to be changed. In such instances, the accessory device may not be identified or detected, and the device may change operation modes based at least in part on the device's sensors determining that the device is tilted at a certain angle and/or is at a certain angle for a certain length of time. The device may determine that the device is generally positioned physically in real space such that it can be viewed by a user, and may optionally determine that the device has not moved in a certain period of time (e.g., 30 seconds, etc.), and, in response, may switch into a voice-forward operating mode.

At block 160, a determination may be made that the docking station is associated with a voice-forward operating mode. For example, docking stations determined to include one or more microphones and one or more speakers may be associated with a voice-forward operation mode, or may automatically cause the device to change to a voice-forward operation mode. In some embodiments, the device may determine that a connection to the docking station causes activation of a voice-forward operating mode at the device. In an example, the device 112 may determine that a touch-forward operating mode is active at the device, such as at the first instance 110, and the touch-forward operating mode may present digital content in a visual format having a second content density that is greater than the first content density of the voice-forward operation mode.

At block 170, a determination may be made that an active application is preventing the device from sleeping. For example, the device 112 may determine that the active video playback application is preventing the device 112 from sleeping because of the content playback. To keep the device 112 from sleeping, the application may activate a wake-lock or other application setting or operation system setting. The device may determine that at least one component of the device (e.g., at least one processor, a display, a sensor, etc.) is in a stay awake system state, where the stay awake system state prevents one or more components of the device from entering a sleep state. For example, the sleep state may be prevented during playback of the video content. In some embodiments, a different component of the device may be in a stay awake system state, such as a display, a location (e.g., GPS, etc.) component, a motion sensor (e.g., accelerometer, gyroscope, etc.) component, communications component, etc.

At optional block 180, it may be determined that the active application is a touch-forward application. For example, the device 112 may determine that the active video playback application is a touch-forward application, and that therefore, the device 112 is in a touch-forward operation mode.

At block 190, changing the device operating mode to the voice-forward operating mode may be delayed or deferred. For example, because the device 112 is being used to consume the touch-forward content and/or is in the stay awake state, the automatic change in operation mode may be temporarily deferred or canceled so as to avoid interrupting the user's consumption. The device 112 may determine that activation of the voice-forward operating mode is to be deferred while the at least one processor is in the stay awake system state. The device 112 may periodically check or query the processor to determine if the processor has been released from the stay awake state. In some embodiments, the application may send a notification or provide an indication that the processor has been released from the stay awake state or an on state. After determining that the at least one processor has been released from the stay awake system state after completion of playback of the video content, the device operation mode may be changed to the voice-forward operation mode, as illustrated at the third instance 130. The device 112 may, in some embodiments, monitor for an audio signal representative of a wake word spoken by a user in the voice-forward mode, or may otherwise listen for a voice input.

Embodiments of the disclosure may include voice-forward graphical user interface mode management, voice-forward management of device operation modes, and selective requests for passwords in voice-forward operation modes. Certain embodiments may determine when device operation mode changes are to be implemented, when operation mode changes are to be deferred or canceled, and when operation modes are to be automatically implemented. Certain embodiments may use voice-forward commands or inputs to cause changes to device operation modes, and certain embodiments may determine whether passwords or other authentication is needed to access information at a device.

Example embodiments of the disclosure provide a number of technical features or technical effects. For example, in accordance with example embodiments of the disclosure, certain embodiments of the disclosure may change device operation modes based at least in part on voice commands, determine whether passwords are needed to access information, identify speakers or users using voice data, automatically download applications or enable remote skills, and present information in various operation mode user interfaces. Certain embodiments may enable different operation modes that may have different user interfaces responsive to connections to certain accessories, voice inputs, coupling to accessories, and other inputs. As a result of improved functionality, device operation mode experiences may be bridged across various operation modes, including touch-forward operation modes and voice-forward operation modes. Embodiments of the disclosure may improve computing efficiency and bandwidth by managing device operation modes and increasing a number of manners of inputs at devices. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
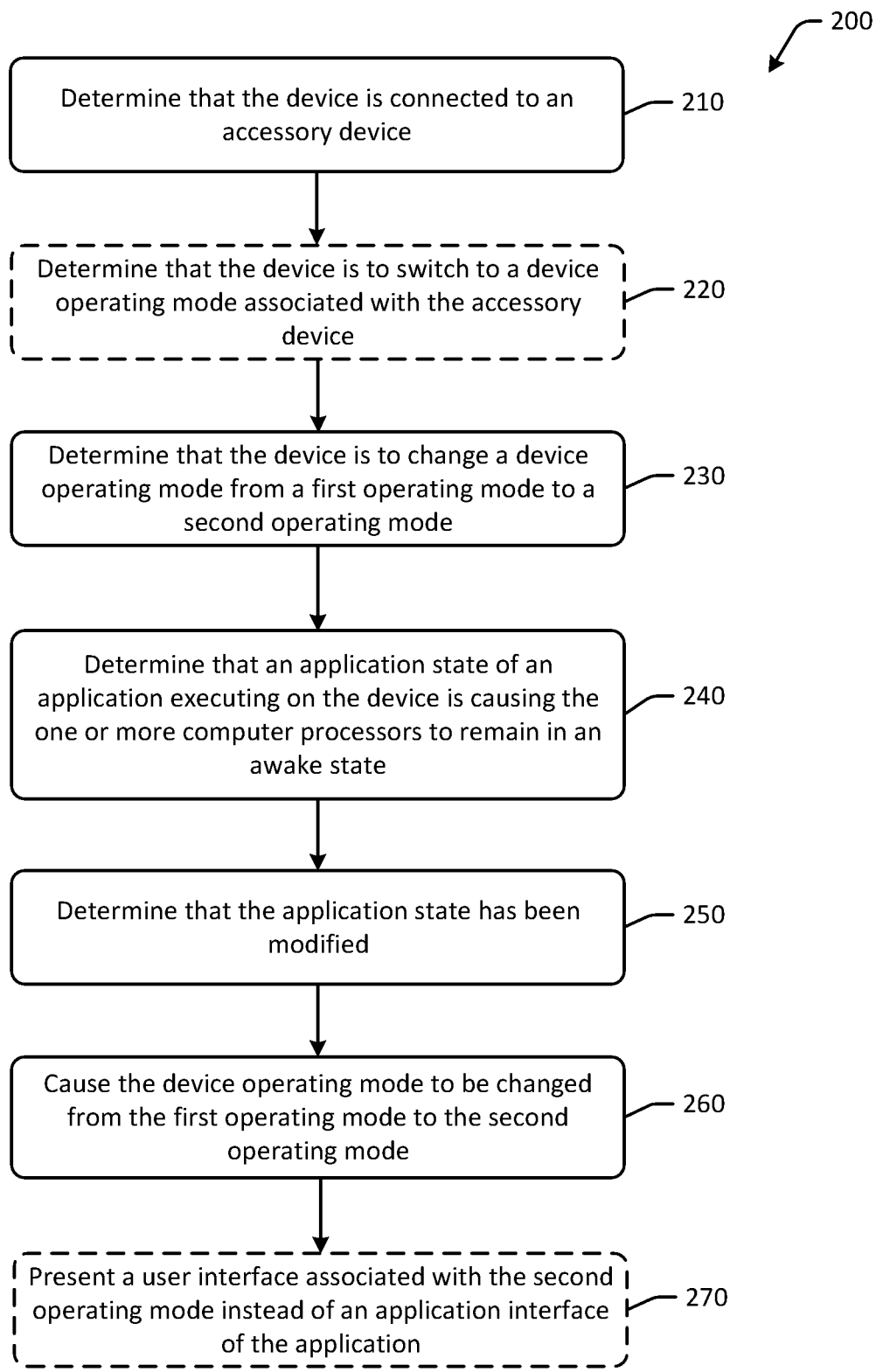
FIG. 2 is a schematic illustration of an example process flow for voice-forward graphical user interface mode management in accordance with one or more example embodiments of the disclosure.

FIG. 2 depicts an example process flow 200 for voice-forward graphical user interface mode management in accordance with one or more example embodiments of the disclosure. While example embodiments of the disclosure may be described in the context of touch-forward and voice-forward operation modes, it should be appreciated that the disclosure is more broadly applicable to any operation mode functionality. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine that the device is connected to a charging device or an accessory device. For example, a tablet or other electronic device may have a connector configured to engage a charging device, such as a wall charger, external battery, docking station, etc., or the device may have a connector port configured to receive a connector of a charging device. The connector and/or connector port may be removably connected to the device. For example, the connector or connector port may be an accessory coupled to the device.

At optional block 220 of the process flow 200, computer-executable instructions stored on a memory of a device, such as a remote server or a user device, may be executed to determine that the device is to switch to a device operating mode or activate a certain operating mode associated with the accessory device or charging device as a result of being coupled to the charging device or other accessory device. For example, in some instances, a handshake protocol or exchange between the charging device or accessory device may be used to determine whether the device is to activate a certain operating mode. In some embodiments, determining that a device is connected to a charging device or other accessory device may include identifying a connected device as the charging device, where a connection to the charging device causes an automatic change in the device operating mode from a first operating mode to a second operating mode, unless a component of the device, such as one or more computer processors or a display, are held in an awake state by an application.

At block 230 of the process flow 200, computer-executable instructions stored on a memory of a device may be executed to determine that the device is to change a device operating mode from a first operating mode to a second operating mode. For example, a connection to a certain type of charging device, or a specific charging device (e.g., as determined by a charging device identifier, etc.), may usually cause automatic changes to a device operating mode of the device, with certain exceptions in some embodiments. For example, a charging device may be associated with an operation mode of a voice-forward operation mode. Connecting the device to that charging device may cause the operation mode of the device to be automatically changed or switched to the voice-forward operation mode. In an example, a docking station may be associated with a second operation mode of a voice-forward operation mode, where the user interface presented at the display is voice-forward or encourages users to interact with the device via voice input (e.g., relatively less number of selectable options, presenting voice hints, etc.). A device may be operating in a first operating mode of a touch-forward operation mode prior to being connected to the docking station charging device. When the device is connected to the docking station, the device may change the device operation mode from the touch-forward operation mode to the voice-forward operation mode. This may be because a user may interact with the device from increased distances while the device is charging and/or docked at the docking station. In some embodiments, the operation mode of the device may always be changed based at least in part on the type of connected device and/or charging device. In other embodiments, the operation mode of the device may be changed unless there is an exception or other rule. In such instances, changes to operation modes may be deferred or canceled. If the device is connected to a normal charging device the first operating mode may persist while the device is connected to the normal charging device (e.g., no mode change may occur, etc.).

At block 240 of the process flow 200, computer-executable instructions stored on a memory of a device may be executed to determine that an application setting of an application, or an application state, executing on the device is causing the one or more computer processors to remain in an awake state. For example, one or more applications or computer programs may be executing on the device. The respective applications may have one or more application settings. The application settings may be settings that relate to operation of the device. For example, the application may have a wake-lock setting that causes one or more components to remain in an "awake" or always on state, as opposed to a hibernate, standby, sleep, off, or other state. The application setting may therefore prevent the computer processor, display, or other component of the device from sleeping while work is being done or the component is being used by the application, for example. In some embodiments, application settings may include a screen-on or display-on setting that causes a display of the device to remain in an illuminated mode. In some instances, displays may remain on as a result of an additional setting (e.g., screen-on setting, etc.), or as a result of a wake-lock setting. Once the application has completed its work, the application setting may be modified or changed so as to remove the hold on the component, such as the processor(s), that are being held in the awake state. Specifically, a first value associated with the application setting may be replaced with a second value associated with the application setting. In some embodiments, computer-executable instructions stored on a memory of a device may be executed to determine that an application setting of an application that is executing or otherwise active on the device is causing the one or more computer processors, or another component of the device, such as a display, to remain in an awake state. This determination may be made by querying active applications, or by determining whether the computer processors are in a wake-lock or awake state. If so, the device may determine that the computer processors are in the wake-lock or awake state as a result of some application setting, and the application causing the wake-lock may not be identified. In some embodiments, application settings of an active application (or an application executing in a foreground of a computing environment, etc.) may be checked to determine whether a certain application setting is active or selected. The automatic change to device operation mode may be deferred while the application setting is active or remains in the same state. In some instances, the automatic change to device operation mode may be canceled if a timeout period elapses without a change to the application setting.

At block 250, computer-executable instructions stored on a memory of a device may be executed to determine that the application setting, or the application state, has been modified. For example, the application setting may be deactivated or changed to a different setting. In one instance, a wake-lock or stay awake setting may be modified or turned off. As a result, the computer processors may no longer be held in an awake state. The application may release resources back to the device. The state or status of the computer processors or other component that is being held awake may be periodically checked, or the application setting may be queried, so as to determine that the application setting has been modified.

At block 260, computer-executable instructions stored on a memory of a device may be executed to cause the device operating mode to be changed from the first operating mode to the second operating mode. For example, once the application setting is modified, the automatic change to the device operation mode as a result of connecting to the charging device may be implemented, and the device operation mode may be changed from the first operation mode to the second operation mode.

At optional block 270, computer-executable instructions stored on a memory of a device may be executed to present a user interface associated with the second operating mode instead of an application interface of the application. For example, the second operating mode may be associated with a different user interface layout or home screen than the first operating mode. In some embodiments, when the device operation mode is changed, an application interface or user interface that was being presented in the previous operation mode may be replaced with the user interface associated with the new operation mode. For example, a user may have been watching a video on Netflix in the first operation mode, and after the change to the second operation mode, the Netflix application interface may be replaced by a user interface or home screen associated with the second operation mode. In some embodiments, the Netflix application interface may be replaced with a reformatted Netflix interface that is reformatted for the second operation mode.

In some embodiments, a timeout period may follow the change to the application setting before a change to the operation mode is implemented. For example, the device may determine that a timeout period has elapsed after the change to the application setting. The device may remain in the touch-forward operating mode and/or may present an application interface of the application in the first operating mode after the application setting has been modified during the timeout period. In some instances, if the application setting is not changed within a certain length of time (e.g., a mode change cancelation length of time after which pending mode changes are canceled, etc.) after being connected to the docking station, the change to the device operation mode may be canceled. For example, if it is determined that a mode change cancelation length of time has elapsed, the device may cancel a change to, or scheduled change to, the device operating mode.

Figure 3:
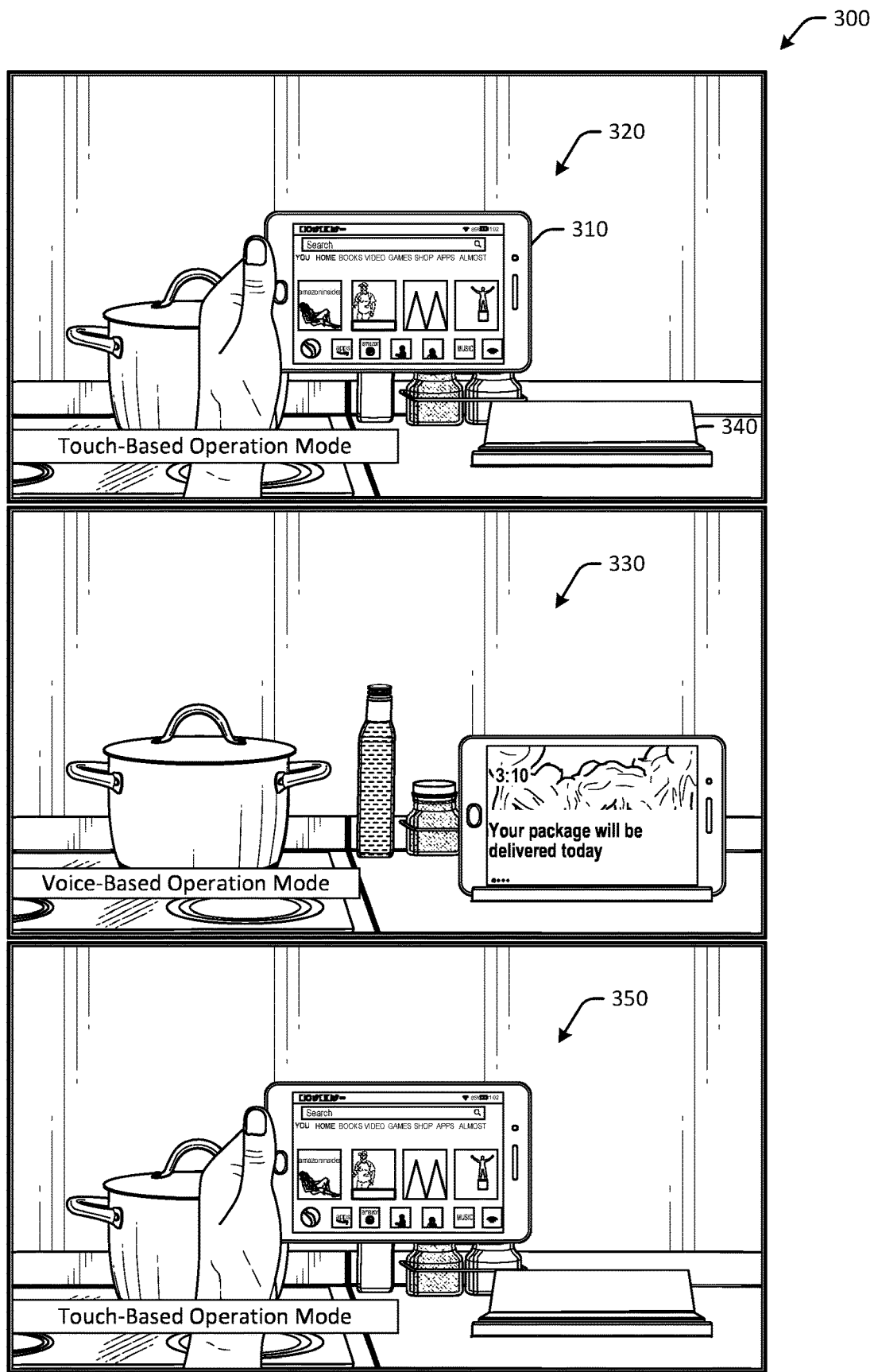
FIG. 3 is a schematic illustration of example user interfaces for various device operation modes in accordance with one or more example embodiments of the disclosure.

FIG. 3 depicts example user interfaces 300 for various device operation modes in accordance with one or more example embodiments of the disclosure. In the example of FIG. 3, a device 310 may be operating in a touch-forward operation mode at a first instance 320. For example, a user of the device 310 may be holding the device and interacting via touch input.

At a second instance 330, the device 310 may be connected to a docking station 340. When connected to the docking station 340, the device 310 may automatically convert or change from the touch-forward operation mode to a voice-forward operation mode. The device 310 may present a user interface or home screen associated with the voice-forward operation mode when in the voice-forward operation mode and/or while connected to the docking station 340.

As illustrated at a third instance 350, if the user disconnects the device 310 from the docking station 340, the device 310 may automatically return to the previous operation mode, or the touch-forward operation mode. In some embodiments, as illustrated, the device 310 may present a home screen or user interface associated with the touch-forward operation mode when disconnected from the docking station 340, while in other embodiments, the device 310 may return to a previously opened application that was open when the device 310 was connected to the docking station 340. For example, when connected to the docking station 340, the device 310 may present a user interface associated with the voice-forward operation mode, and after determining that the device 310 is disconnected from the charging device or docking station 340, an application interface of the application in the touch-forward operation mode may be presented.

In instances where disconnecting from the docking station 340 causes the device 310 to return to a previously opened application, the device 310 may determine a first application user interface that is presented prior to the connection to the docking station 340, present a voice-forward operating mode user interface after the voice-forward operating mode is activated, determine that the docking station 340 is disconnected, and again present the first application user interface in the touch-forward operating mode. In some embodiments, when disconnected from the docking station 340, or when returning to a touch-forward operation mode, the device 310 may cease monitoring for an audio signal or wake word.

Figure 4:
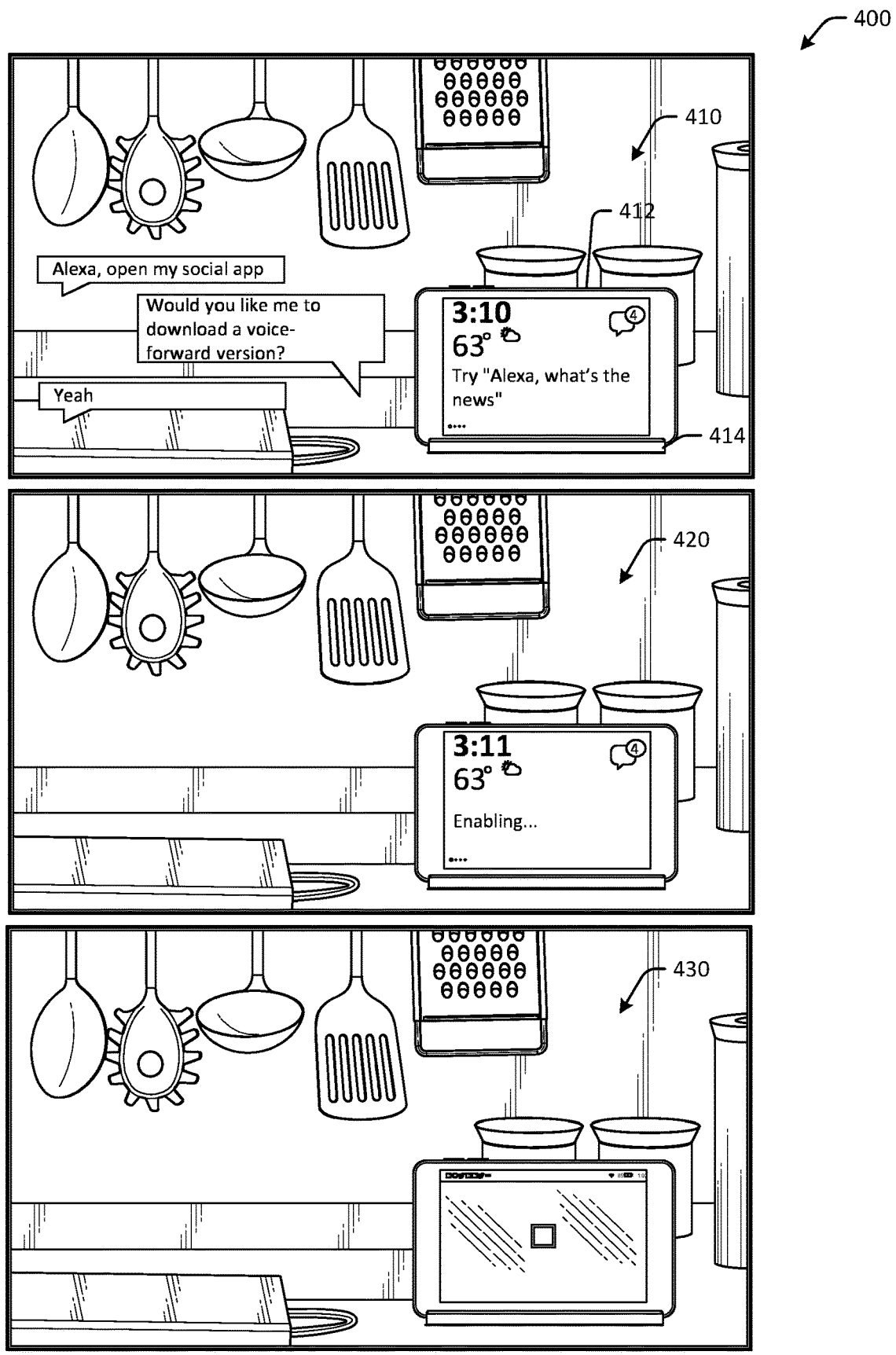
FIG. 4 is a schematic illustration of an example use case for voice-forward enablement of different versions of an application in accordance with one or more example embodiments of the disclosure.

FIG. 4 is a schematic illustration of an example use case 400 for voice-forward enablement of different versions of an application in accordance with one or more example embodiments of the disclosure.

At a first instance 410, a device 412 may be docked or connected to a docking station 414. The device 410 may be in a voice-forward operation mode. While the device 412 is docked, a user may say a voice input of "Alexa, can you open my photo app?" The device 412 may determine that the voice input is indicative of a request to open an application. The device 412 may determine whether or not a voice-forward version of the requested application is available (e.g., installed on, etc.) to open at the device 412, so that opening the application does not cause a device operation mode change. For example, the device 412 may determine that the version of the application available at the device 412 is a touch-forward application version. The device 412 may determine that a voice-forward version of the application is available for enablement. For example, the device 412 may query an application store or data repository to determine that a voice-forward version of the requested application is available for enablement, such as by downloading to the device 412 or activating a remote application at a remote server. The device 412 may audibly present a query requesting permission to enable the voice-forward version. For example, at the first instance 410, the device may audibly present "there is a voice-forward version of the photo app available; should I enable it?" The user may say "yes" and the device 412 may determine that the user provided an affirmative response. Requesting permission to enable an application or a version of an application (or download other software) may include causing presentation of an audible query requesting permission to enable the version of the application.

As a result, at a second instance 420, the device 412 may enable the voice-forward version of the application. An indication of installing or activation progress may be presented at the device 412.

At a third instance 430, the device 412 may cause the voice-forward version of the application to be opened. The user may interact with the voice-forward version of the application using voice inputs.

Figure 5:
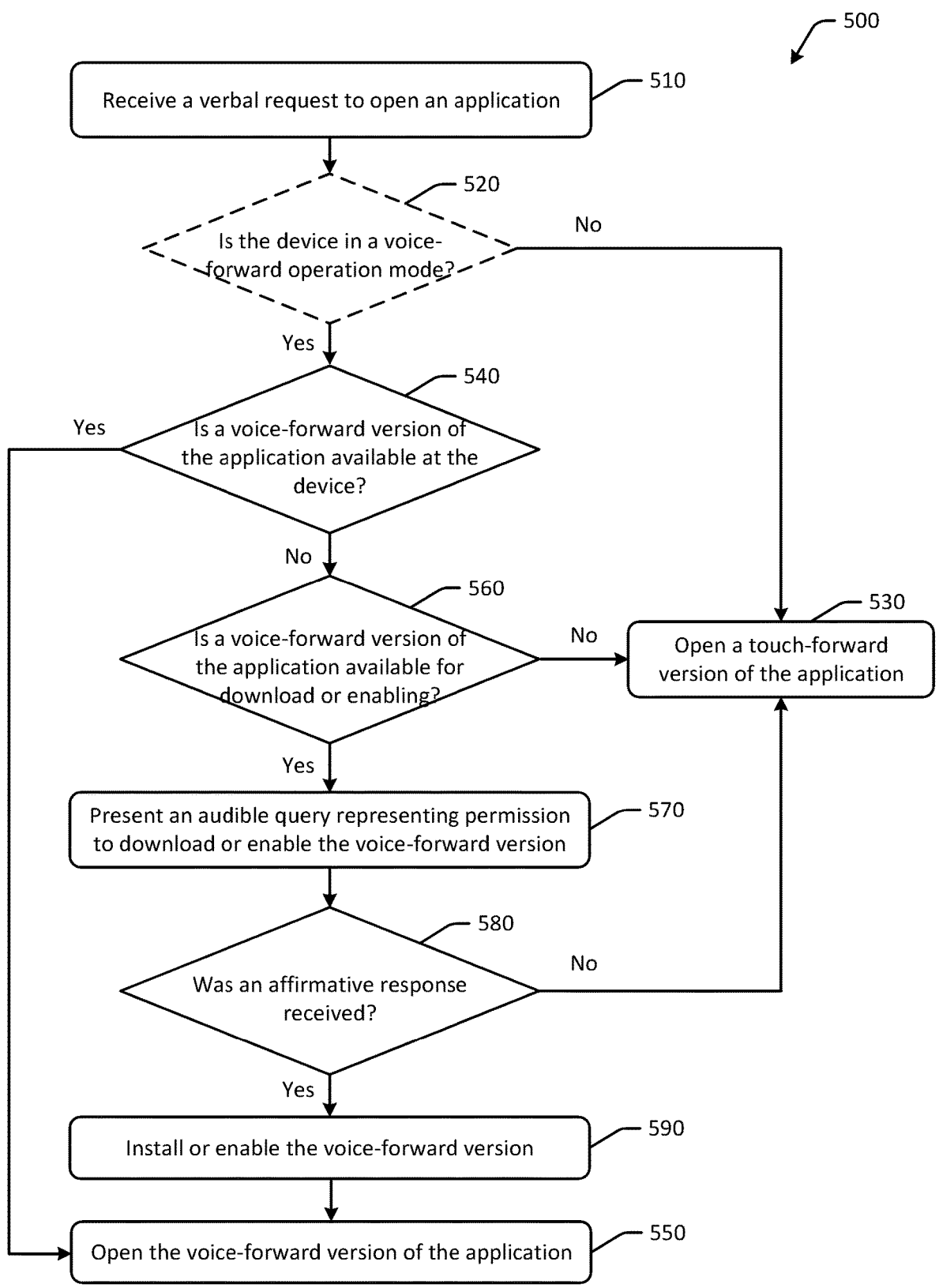
FIG. 5 is a schematic illustration of an example process flow for voice-forward enablement of different versions of an application in accordance with one or more example embodiments of the disclosure.

FIG. 5 depicts an example process flow 500 for voice-forward enablement of skills or different versions of an application in accordance with one or more example embodiments of the disclosure. While example embodiments of the disclosure may be described in the context of touch-forward and voice-forward operation modes, it should be appreciated that the disclosure is more broadly applicable to any operation mode functionality. Some or all of the blocks of the process flows in this disclosure may be performed in a distributed manner across any number of devices. The operations of the process flow 500 may be optional and may be performed in a different order.

At block 510 of the process flow 500, a verbal request to open an application may be received. For example, a microphone at a device, such as a tablet device or a speaker device, may be used to capture an audio signal in an ambient environment. The audio signal may be converted to a digital signal and/or voice data. The audio signal may be determined to be a voice command, for example, by the presence of a wake word, such as "Alexa." A meaning of the voice command may be determined using voice processing, which may include speech-to-text processing, natural language processing, and/or other forms of voice processing. The meaning of the voice command "Alexa, open Amazon music" may be determined to be a verbal request to open an application. In other instances, a verbal request to access content or a particular service, such as a streaming service, may be received.

At optional determination block 520, a determination may be made as to whether the device is in a voice-forward operating mode. For example, computer-executable instructions stored on a memory of a device may be executed to determine an operation mode of the device. Operation modes may include, for example, touch-forward operation modes, voice-forward operation modes, hybrid operation modes, and/or other operation modes. The operation mode may be optionally determined to be a voice-forward operation mode. In some embodiments, the operation mode may be determined by identifying a type of charging device connected to the device. For example, if the device is connected to a docking station, the device may be determined to be in a voice-forward operation mode. If it is determined at determination block 530 that the device is not in a voice-forward operation mode, the process flow 500 may proceed to block 530, at which a touch-forward version of the application may be opened. For example, if the device is not in a voice-forward operation mode, or the device is in a touch-forward operation mode, the device may open a touch-forward version of the application that was requested by a user in the verbal request. Touch-forward versions of applications may be versions of applications, or independent applications, that have a touch-forward or touch-forward user interface that encourages user to interact with the application using touch inputs as a primary method of interaction. In some instances, applications may have different versions with different user interfaces geared towards touch-forward or voice-forward interactions, while in other instances, separate applications (or standalone applications) may be used to provide different user interfaces of the same applications. If the device is not in a voice-forward operation mode, as determined at determination block 520, that may indicate that the user is physically interacting with the device, and that the user therefore desires that a touch-forward version of the application be opened. Accordingly, the touch-forward version of the application may be opened if the device is operating in a non-voice-forward operation mode. When opening the touch-forward version of the application, the device may change operation modes to a touch-forward operation mode.

If it is determined at optional determination block 520 that the device is operating in a voice-forward operation mode, the process flow 500 may proceed to determination block 540, at which a determination may be made as to whether a voice-forward version of the application is available at the device. For example, an available application at the device may be configured to operate in different operation modes, such as touch-forward or voice-forward. In some instances, two separate versions of the application may be available at the device, each configured to operate in a different operation mode. A determination may be made as to whether a voice-forward version of the application (e.g., whether the application itself can be configured to operate in voice-forward mode or there is a separate voice-forward version of the application, etc.) is available at the device. Availability at the device may indicate that the program or application is available for execution at the device. If it is determined at determination block 540 that there is a voice-forward version of the application available at the device, the process flow may proceed to block 550, at which the voice-forward version of the application is opened, or the relevant application setting that controls the operation mode of the application is set to a voice-forward operation mode. The user may then interact with the application using voice input and/or touch input. When opening the touch-forward version of the application, the device may change operation modes to a touch-forward operation mode.

If it is determined at determination block 540 that there is no voice-forward version of the application available at the device, or that there is no operation mode setting of the application that can be changed to cause voice-forward operation, the process flow may proceed to determination block 560, at which a determination may be made as to whether a voice-forward version of the application is available for enablement. Enablement may include downloading data onto a client device, activating a remote application in connection with a user account associated with the client device (e.g., enabling an Alexa skill at one or more remote servers, etc.), activating a local application, and the like. For example, a determination may be made as to whether a voice-forward version of the application is available for enablement, such as whether the application is available for enabling at a remote server, and/or downloading from an application store, a data repository, another device, or another datastore. In some embodiments, the voice-forward version may be configured to be enabled as a skill, which may interface with a separate application through one or more application programming interface(s). Access to the skill may require user permission to be enabled in some instances. Accordingly, in some embodiments, a voice-forward version of an application may not have to be determined to be available for enablement, but access to a voice-forward skill may be determined to be available, or both.

If it is determined at determination block 560 that there is no voice-forward version of the application available for download and/or no skill or remote application available for enablement, the process flow may proceed to block 530, at which the touch-forward version of the application may be opened. When opening the touch-forward version of the application, the device may change operation modes to a touch-forward operation mode.

If it is determined at determination block 560 that there is a voice-forward version of the application available for enablement or download, the process flow may proceed to block 570, at which an audible query representing permission to download or enable the voice-forward version may be presented. For example, one or more speakers of the device may be used to present an audible query of "there is a voice-forward version of Amazon music available, should I enable it?" or "would you like to enable the Amazon music skill?" In some embodiments, a visual query may be presented on a display of the device in addition to or instead of the audible query. The process flow may proceed to determination block 580.

At determination block 580, a determination may be made as to whether an affirmative response was received. For example, after presenting the audible query or visual selection, the device may monitor for a verbal affirmative response such as "yes" or "go ahead," or a selection of a "yes" or other affirmative input may be received at a display of the device. If it is determined at determination block 580 that an affirmative response was not received, such as a "no" response, or that no response was received within a time interval, the process flow may proceed to block 530, at which the touch-forward version of the application may be opened.

If it is determined at determination block 580 that an affirmative response was received, the process flow may proceed to block 590, at which the voice-forward version of the application may be downloaded or installed, or the skill may be enabled. After enabling, the process flow may proceed to block 550, at which the voice-forward version of the application may be opened. In some embodiments, access to an application or service, such as a music service or video subscription service, may be enabled instead of a voice-based version of an application. For example, a request may be made of an aggregator service, which may select a specific service provider from a number of service providers. In some embodiments, such aggregators may not be applications, but may handle requests for services or content.

As a result of the process flow, a user of the device may not have to change a device operation mode to interact with an application. For example, if the user is interacting with the device in a voice-forward operation mode, and requests an application that is available in a touch-forward operation mode, the device may automatically implement some or all of process flow 500 to facilitate continued use of the device and the requested application in the voice-forward mode, without having the user physically interact with or touch the device, in some embodiments.

Figure 6:
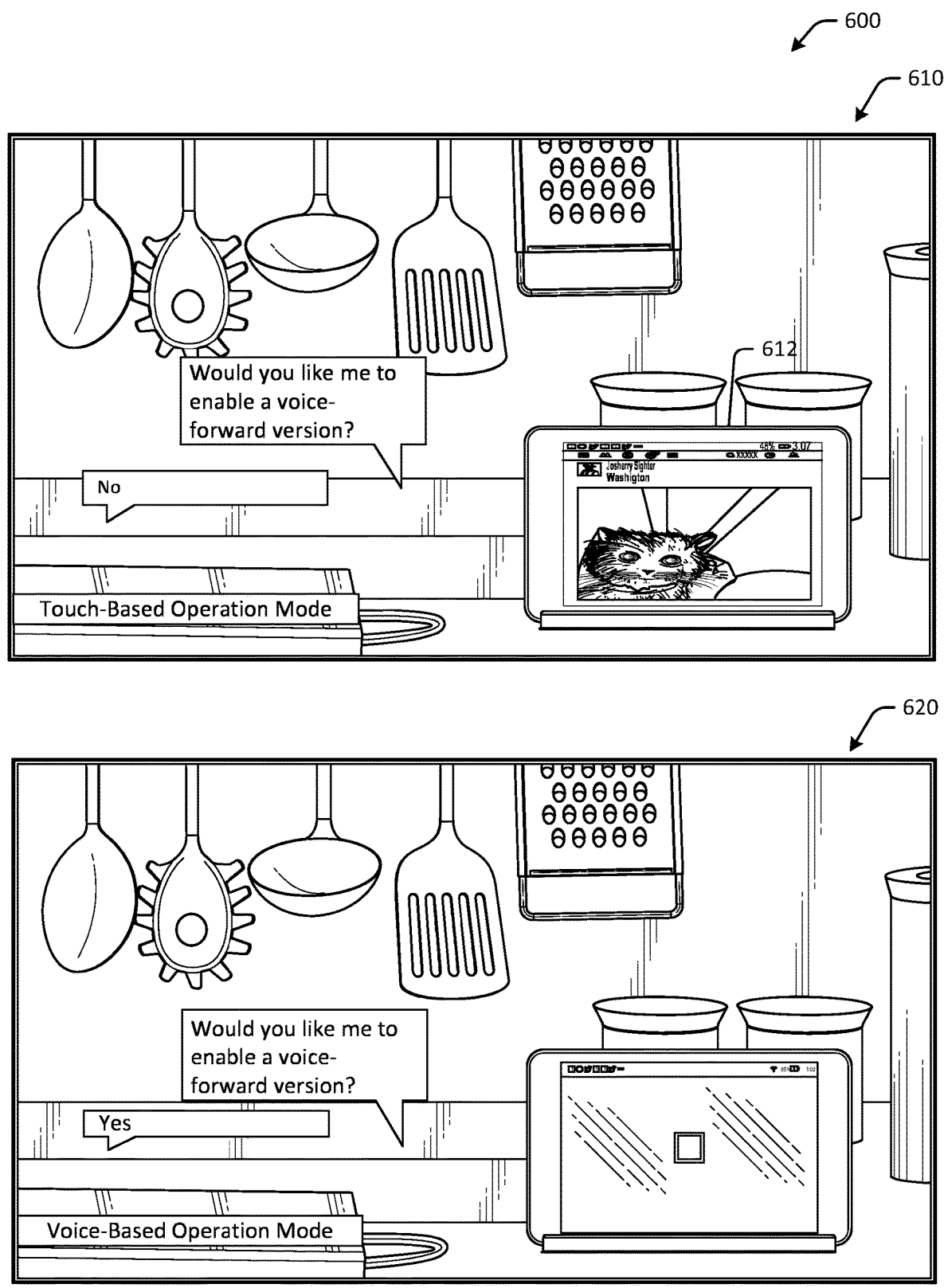
FIG. 6 is a schematic illustration of example user interfaces for various device operation modes and corresponding versions of applications in accordance with one or more example embodiments of the disclosure.

FIG. 6 depicts example use cases 600 of various device operation modes and corresponding versions of applications in accordance with one or more example embodiments of the disclosure. In FIG. 6, users may request that a certain application be opened at a device.

If the requested application is in a format or configured to operate in an operation mode that is different than a current operation mode of the device, the device may determine whether another version of the application is available for enablement or to use, so that the device can continue in the current operation mode. If there is another version of the application, the device may request permission to enable and launch the application version. However, in some instances permission to enable may not be granted. As a result, the existing version of the application may be opened or launched at the device, and the device operation mode may be changed accordingly. For example, in FIG. 6 at a first instance 610, a user may request that a social media application be launched. The device 612 may be in a voice-forward operation mode. However, a voice-forward version of the application may not be available at the device 612. If a voice-forward version is available for enable, the device may request permission to enable. If permission is not granted, or there is no voice-forward version of the application available, the device 612 may proceed with opening the touch-forward version of the application. As shown at the first instance 610, although the device 612 is in a landscape orientation, the application may be launched in a touch-forward operation mode, and may be presented in a portrait orientation, regardless of the positioning of the device in landscape mode. The user may interact with the application in touch-forward operation mode.

If a version of the application in touch-forward mode is determined to be available, and permission was granted to enable, the application version may be enabled and launched, as shown at a second instance 620. As a result, the user may continue interacting with the device and the launched application in the existing voice-forward operation mode.

Figure 7:
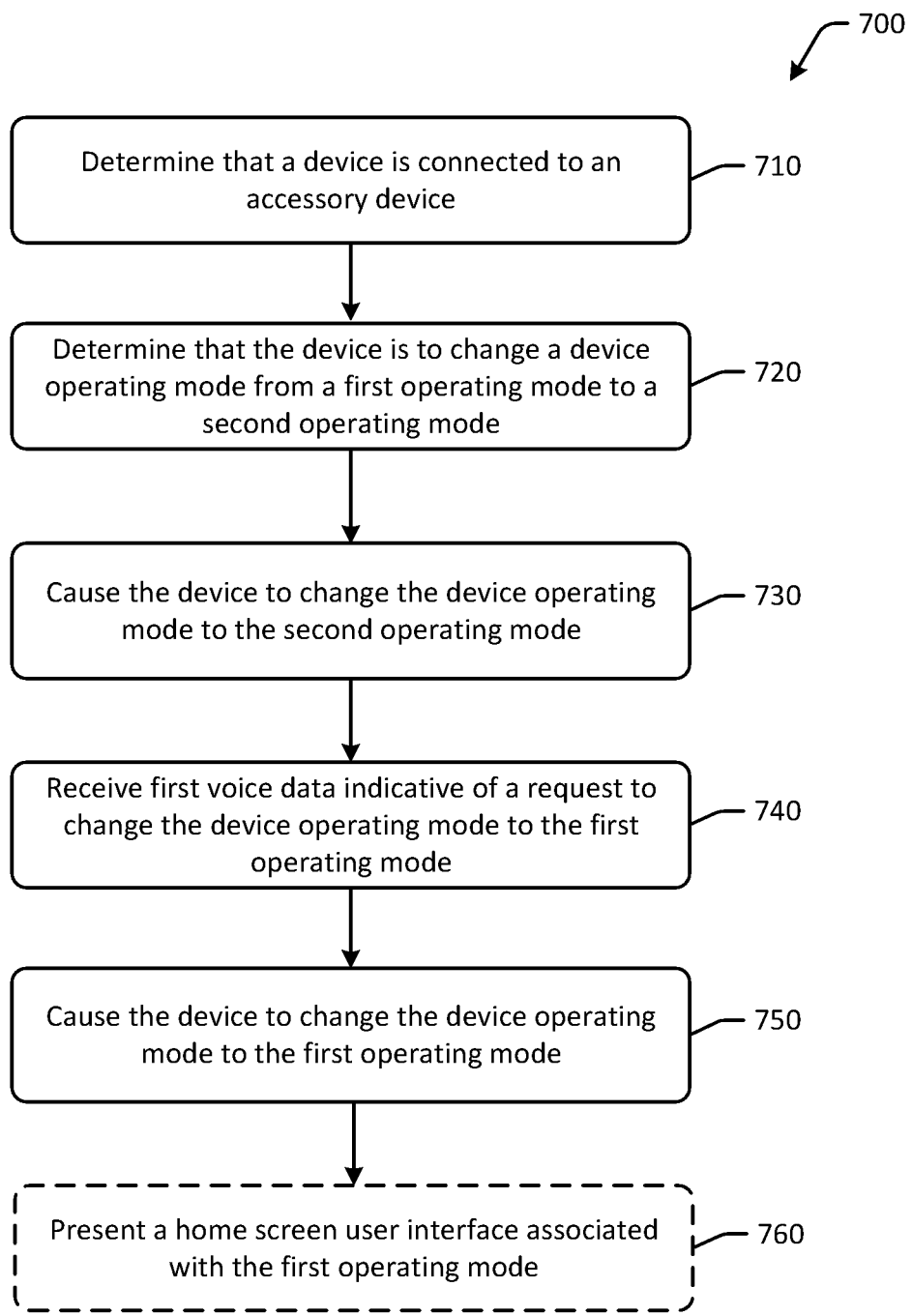
FIG. 7 is a schematic illustration of an example process flow for voice-forward changes to device operation modes in accordance with one or more example embodiments of the disclosure.

FIG. 7 depicts an example process flow 700 for voice-forward changes to device operation modes in accordance with one or more example embodiments of the disclosure. While example embodiments of the disclosure may be described in the context of touch-forward and voice-forward operation modes, it should be appreciated that the disclosure is more broadly applicable to any operation mode functionality. Some or all of the blocks of the process flows in this disclosure may be performed in a distributed manner across any number of devices. The operations of the process flow 700 may be optional and may be performed in a different order.

At block 710 of the process flow 700, computer-executable instructions stored on a memory of a device, such as a remote server or a user device, may be executed to determine that a device is connected to an accessory device. For example, a tablet or other electronic device may have a connector configured to engage a charging device, such as a wall charger, external battery, docking station, etc., or the device may have a connector port configured to receive a connector of a charging device. The connector and/or connector port may be removably connected to the device. For example, the connector or connector port may be an accessory coupled to the device. In other instances, accessory devices may include a stand, a charging cradle, a lamp, or another accessory device.

At block 720 of the process flow 700, computer-executable instructions stored on a memory of a device may be executed to determine that the device is to change a device operating mode from a first operating mode to a second operating mode. For example, a connection to a certain type of charging device, or a specific charging device (e.g., as determined by a charging device identifier, etc.), may usually cause automatic changes to a device operating mode of the device, with certain exceptions in some embodiments. For example, a charging device may be associated with an operation mode of a voice-forward operation mode. Connecting the device to that charging device may cause the operation mode of the device to be automatically changed or switched to the voice-forward operation mode. In an example, a docking station may be associated with a second operation mode of a voice-forward operation mode, where the user interface presented at the display is voice-forward or encourages users to interact with the device via voice input (e.g., relatively less number of selectable options, presenting voice hints, etc.). A device may be operating in a first operating mode of a touch-forward operation mode prior to being connected to the docking station or other charging device. When the device is connected to the docking station, the device may change the device operation mode from the touch-forward operation mode to the voice-forward operation mode. This may be because a user may interact with the device from increased distances while the device is charging and/or docked at the docking station. In some embodiments, the operation mode of the device may always be changed based at least in part on the type of connected device and/or charging device. In other embodiments, the operation mode of the device may be changed unless there is an exception or other rule. In such instances, changes to operation modes may be deferred or canceled.

At block 730 of the process flow 700, computer-executable instructions stored on a memory of a device may be executed to cause the device to change the device operating mode to the second operating mode. The second operation mode may be a voice-forward operation mode configured to encourage voice inputs by users or another type of operation mode. For example, after the device is connected to a certain charging device such as the docking station, the automatic change to the device operation mode as a result of connecting to the charging device may be implemented. In an example, the device operation mode may be changed from a first operation mode of voice-forward operation mode to a second operation mode of a touch-forward operation mode, or vice versa.

At block 740, computer-executable instructions stored on a memory of a device may be executed to receive first voice data indicative of a request to change the device operating mode to the first operating mode. For example, a microphone of the device may capture sound in an ambient environment and may generate an audio signal representative of the sound. The audio signal may be converted to voice data and may be processed using voice processing techniques to determine a meaning of the voice data. In some embodiments, the voice data and/or audio signal may be sent or streamed to a remote server for voice processing and/or to determine a meaning of the voice data. In some embodiments, detection of a wake word, such as "Alexa," may be performed locally at the device. In an example, a user may say a voice input of "Alexa, change to a touch-forward operation mode." Voice data representing the voice input may indicate that the user is requesting to change the device operation mode to the touch-forward operation mode. In some embodiments, the device may perform voice processing locally, while in other embodiments, the device may receive instructions or an indication of the meaning of the voice data from a remote server or other computer system. Other voice commands or voice inputs may include voice commands to close applications, close operation modes, open operation modes, open applications, switch applications, switch operation modes, etc.

At block 750, computer-executable instructions stored on a memory of a device may be executed to cause the device to change the device operating mode to the first operating mode. The first operation mode may be a touch-forward operation mode configured to encourage touch inputs by users or another type of operation mode. For example, the device operation mode may be changed (or caused to change) to the operation mode that was requested by the user, which may be the first operation mode in this example. In an example, the device operation mode may be changed from a second operation mode of touch-forward operation mode to a first operation mode of a voice-forward operation mode, or vice versa.

At optional block 760, computer-executable instructions stored on a memory of a device may be executed to present a home screen user interface associated with the first operating mode. For example, the device may be returned to a touch-forward operation mode based on the verbal request from the user. After changing to the touch-forward operation mode, a home screen user interface for the touch-forward operation mode may be presented at the device. Previously presented application interfaces or user interfaces associated with the second operation mode, or the voice-forward operation mode, may be closed and/or replaced by the home screen user interface for the touch-forward operation mode. For example, a user may have been watching a news briefing video in the second operation mode, and after the change back to the first operation mode, the news briefing video may be replaced by a user interface or home screen associated with the first operation mode, such as a home screen with application access shortcuts. In some embodiments, the news briefing video may be replaced with a reformatted for the second operation mode and presented. In some embodiments, when returning to the first operating mode, the last presented or most recent application may be presented. For example, if a news application was active in the first device operating mode prior to the switch to the second device operating mode, when the device returns to the first operating mode, the news application may be presented again.

Figure 8:
FIG. 8 is a schematic illustration of an example use case for voice-forward changes to device operation modes in accordance with one or more example embodiments of the disclosure.

FIG. 8 is a schematic illustration of an example use case 800 for voice-forward changes to device operation modes in accordance with one or more example embodiments of the disclosure. At a first instance 810, a device 812 may be docked at a docking station 814. The device 812 may be in a voice-forward operation mode. In some embodiments, the device 812 may not have to be docked in order to be in a voice-forward operation mode.

While the device 812 is in the voice-forward operation mode, a user may say a user utterance or a voice input of "change to touch mode." The device 812 may determine that the voice input is a request to change the operation mode of the device. To determine what content to present with the changed operation mode, in some embodiments, the device 812 may maintain a presented application interface, but may present a reformatted version of the application interface in accordance with the change in operation mode. For example, the device may determine an active application executing on the device, and may reformat an application interface presented at the device in the touch-forward operating mode for presentation in the voice-forward operating mode, or may reformat the application interface from voice-forward operation mode to touch-forward operation mode. The reformatted application interface may be presented at the device.

In some embodiments, when a home screen user interface is presented at the time the voice input to change operation modes is received, the device may change operation modes and present another home screen user interface that is associated with the updated operation mode. For example, the user interface presented at the first instance 810 may be a home screen user interface for a voice-forward operation mode of the device. At a second instance 820, a home screen user interface for a touch-forward operation mode may be presented when the device changes to the touch-forward operation mode responsive to the voice input from the user.

Figure 9:
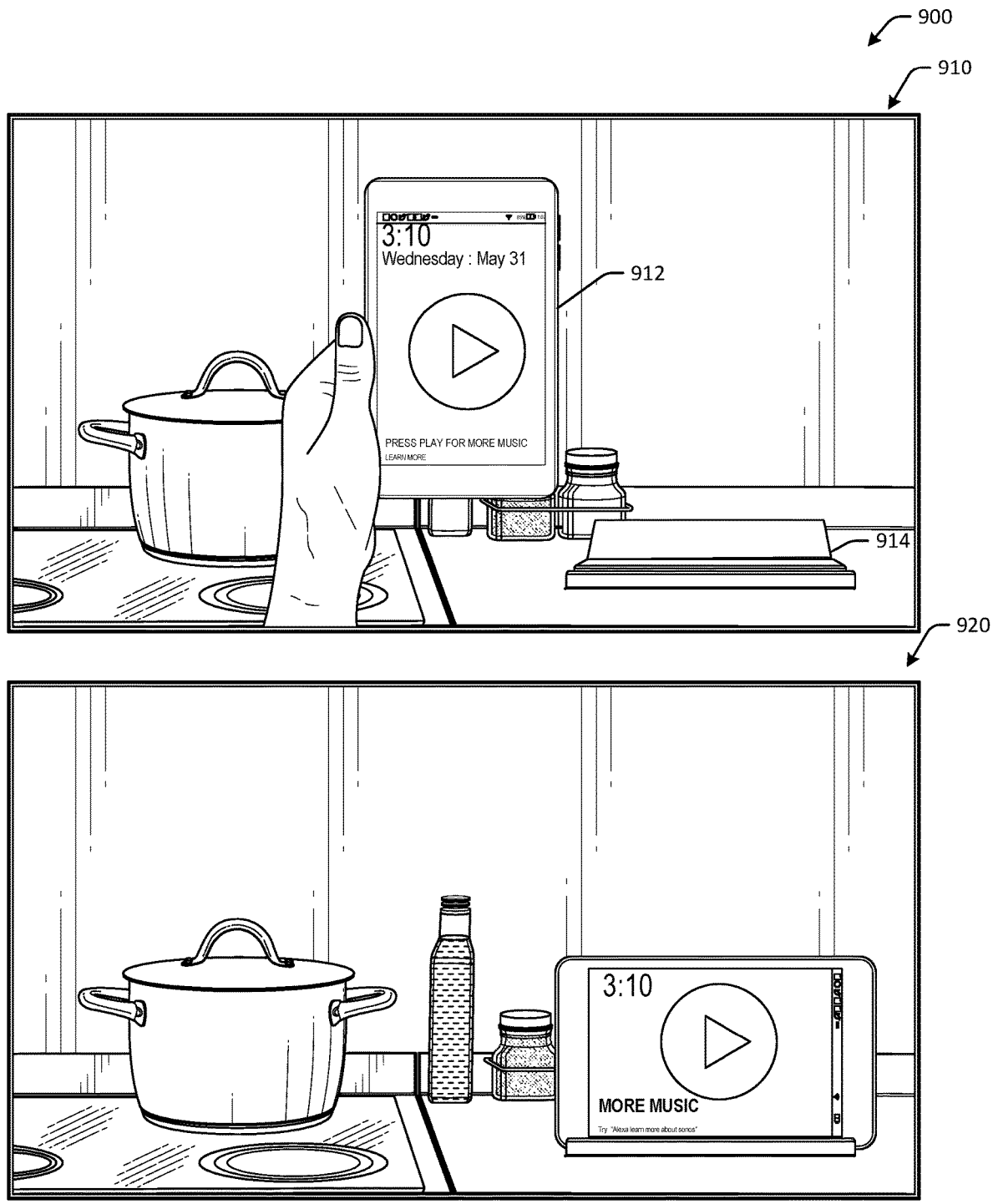
FIG. 9 is a schematic illustration of example user interfaces of an application in different device operation modes in accordance with one or more example embodiments of the disclosure.

FIG. 9 is a schematic illustration of example user interfaces 900 of an application in different device operation modes in accordance with one or more example embodiments of the disclosure. At a first instance 910, a device 912 may be used in a touch-forward operation mode or a tablet operation mode while a user is holding the device 912. An application interface, such as a shopping application interface, may be presented in a first configuration at the device 912 while the device is in the touch-forward operation mode.

At a second instance 920, the device 912 may be docked at a docking station 914. When the device 912 is docked, the device 912 may automatically change a device operation mode from the touch-forward operation mode to a voice-forward operation mode. As a result, the same application may be presented, but the application interface and/or a user interface that is presented may be configured for voice input as a primary manner of interaction with the device 912. The user may cause the device 912 to change operation modes using voice input (e.g., "switch to tablet mode," etc.), by verbally requesting that a touch-forward application be opened or that the voice-forward operation mode be closed or canceled (e.g., "close voice-forward mode," etc.), by physically interacting with the device, and so forth.

Figure 10:
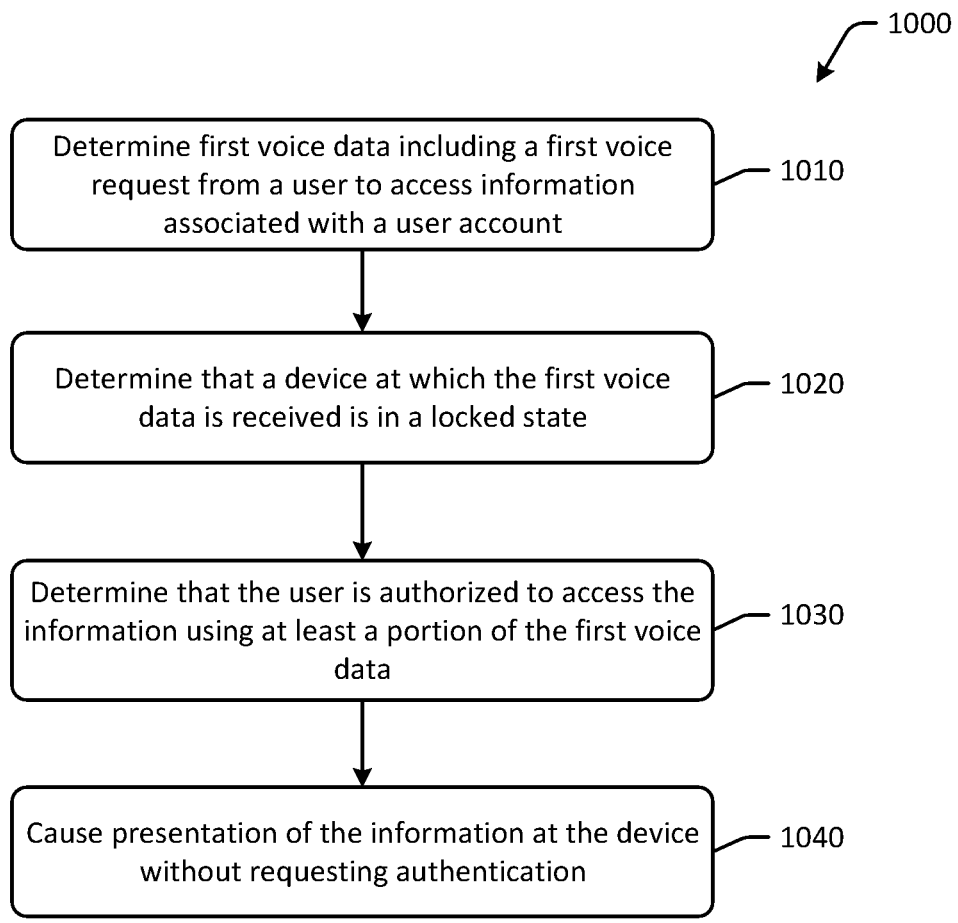
FIG. 10 is a schematic illustration of an example process flow for selective requests for passwords for voice-forward requests for information or applications in accordance with one or more example embodiments of the disclosure.

FIG. 10 depicts an example process flow 1000 for selective requests for passwords for voice-forward requests for information or applications in accordance with one or more example embodiments of the disclosure. While example embodiments of the disclosure may be described in the context of touch-forward and voice-forward operation modes, it should be appreciated that the disclosure is more broadly applicable to any operation mode functionality. Some or all of the blocks of the process flows in this disclosure may be performed in a distributed manner across any number of devices. The operations of the process flow 1000 may be optional and may be performed in a different order.

At block 1010 of the process flow 1000, computer-executable instructions stored on a memory of a device, such as a remote server or a user device, may be executed to determine first voice data including a first voice request from a user to access information associated with a user account. For example, a user in an ambient environment of a device may say "What's on my calendar for this afternoon?" or "Alexa, what's on my calendar this afternoon?" The voice input or voice request may be captured by one or more microphones of the device and converted to voice data. The voice data may be processed to determine a meaning of the voice input. The voice request may be determined to be a request to access information, such as calendar event information, associated with a user account, or a user account that is associated with the device and/or a calendar application on the device. In some embodiments, the voice data may be processed locally, while in other embodiments, the voice data may be sent to a remote server or other computer system for processing. In some embodiments, voice requests may be for certain information from an application, such as calendar event information from a calendar application, contact information from a contacts or directory application, bank account balance information from a banking application, and the like, whereas in other embodiments, voice requests may be to open certain applications. For example, a user may say "Alexa, open my calendar," and so forth. Such requests may be treated or processed differently than requests for certain information that may be determined from applications.

At block 1020 of the process flow 1000, computer-executable instructions stored on a memory of a device may be executed to determine that a device at which the first voice data is received is in a locked state. For example, the device or a remote server may determine that the device is protected by a password, or that access to the device is restricted without some form of authentication of a user. Access to the device and/or information or applications stored at the device may be restricted to authorized users. In some embodiments, access or permission may be granted based on touch or voice input of a passcode (e.g., alphanumeric characters, etc.), a gesture, a biometric marker or identifier (e.g., fingerprint, face scan, voice match, etc.), or another form of password. To determine whether a device is protected by a password, the device and/or remote server may determine whether a password setting is active at the device. Such determinations may be made at the time, or within a time interval of, the voice request is made. In some embodiments, devices may be transitioned from a locked state to an unlocked state using voice identification, authentication (e.g., voice command in addition to facial recognition or camera input, etc.), or other means.

At block 1030 of the process flow 1000, computer-executable instructions stored on a memory of a device may be executed to determine that the user is authorized to access the information using at least a portion of the first voice data. For example, the device may stream and/or send a portion of voice data and/or the audio signal to a remote server to determine whether the user that requested the information is authorized to access the information that was requested. Authorization may be determined based at least in part on a match between attributes of the voice of the speaker or user and a set of stored attributes representing a voice of an authorized user, in order to determine whether the user is the same as an authorized user.

To determine authorization, the remote server, or the device locally, may compare the voice data of the voice request, or attributes extracted from the voice data, to patterns of voices of users that are authorized to access the device. Results of the comparison may be used to generate a confidence score that represents a likelihood or probability that the user making the voice request is the same as an authorized user. The confidence score may be representative of a match between the requesting user's voice and the voice of an authorized user in some embodiments. Based at least in part on the voice data and/or attributes of the user's voice as determined from the voice data or audio signal, a determination may be made that the user making the voice request is authorized to access the information that was requested.

At block 1040, computer-executable instructions stored on a memory of a device may be executed to cause presentation of the information at the device without requesting authentication. For example, the remote server may cause the device to, or the device may, present the information that was requested without requesting the password. For example, the device may audibly or visually present the requested calendar information to the user while bypassing the password restriction on the device. In an example, the device may audibly present "you have a 3:00 meeting with LeBron James in Atlanta" responsive to the user's voice request. In another example, the device may present visual event information indicating the 3:00 meeting on the user's calendar. If the device was in a touch-forward operation mode, the device may have required input of the password, whereas in the voice-forward operation mode, the device may bypass the password requirement and present the requested information without requiring the password.

Figure 11:
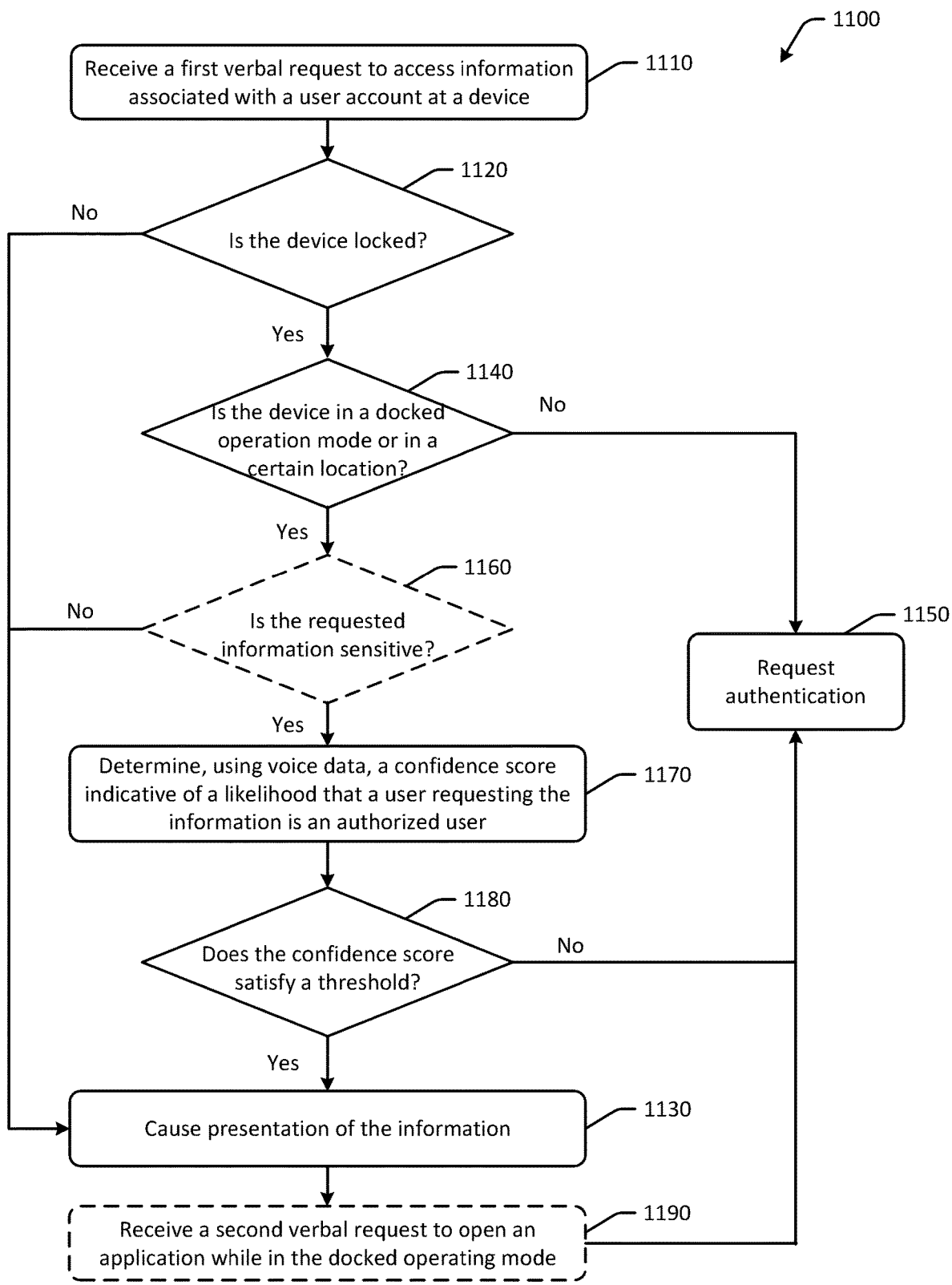
FIG. 11 is a schematic illustration of an example process flow for selective requests for authentication for voice-forward requests for information or applications in accordance with one or more example embodiments of the disclosure.

FIG. 11 depicts an example process flow 1100 for selective requests for authentication for voice-forward requests for information or applications in accordance with one or more example embodiments of the disclosure. While example embodiments of the disclosure may be described in the context of touch-forward and voice-forward operation modes, it should be appreciated that the disclosure is more broadly applicable to any operation mode functionality. Some or all of the blocks of the process flows in this disclosure may be performed in a distributed manner across any number of devices. The operations of the process flow 1100 may be optional and may be performed in a different order.

At block 1110, a first verbal request to access information associated with a user account may be received at a device. For example, a microphone at a device, such as a tablet device or a speaker device, may be used to capture an audio signal in an ambient environment. The audio signal may be converted to a digital signal and/or voice data. The audio signal may be determined to be a voice command, for example, by the presence of a wake word, such as "Alexa." A meaning of the voice command may be determined using voice processing, which may include speech-to-text processing, natural language processing, and/or other forms of voice processing. The meaning of the voice command "Alexa, what is Adam's phone number?" may be determined to be a verbal request to access information associated with a user account. Information associated with a user account may include contact information, calendar information, bank account information, order or purchase history information, and/or other information that may be specific to a user or to a device. Information associated with a user account may include information that is associated with user accounts of various applications stored at the device, such as service provider applications (e.g., rideshare applications, on demand applications, etc.). The process flow may proceed to determination block 1120.

At determination block 1120, a determination may be made as to whether the device is in a locked state. For example, for a device that is password protected, a locked state may indicate that the password has not been entered. Once entered, the device may enter an unlocked state. At block 1120, a determination may be made by the device or by a remote server as to whether the device is in a locked state. If the device is in a locked state, a request for authentication may be presented, so as to unlock the device. For example, authentication may include passwords, passcodes, biometric signatures, gestures, and/or other authentication mechanisms. A locked state may prevent access to the device until authentication is verified. Passwords may be alphanumeric passwords, graphic passwords, audible passwords, and the like. Other forms of authentication may include biometric passwords, gesture passwords, personal identification numbers, and/or other forms of authentication. If it is determined that the device is not in a locked state at determination block 1120, the process flow may proceed to block 1130, at which presentation of the information may be caused, or the information may be presented at the device. For example, the device may present on a display, or may audibly present, the information requested by the user, such as by audibly presenting "Adam's phone number is 888-280-4331." In some embodiments, the requested information may be presented regardless of an operation mode of the device if the device is not in a locked state.

If it is determined at determination block 1120 that the device is in a locked state, the process flow may proceed to determination block 1140, at which a determination may be made as to whether the device is in a docked operation mode or in a certain location. A docked operation mode may be, for example, a voice-forward operation mode or another operation mode associated with a docked device for which the user may not be in physical proximity to or may not be easily able to physically touch the device. If it is determined that the device is not in a docked operation mode, the process flow may proceed to block 1150, at which authentication may be requested. For example, if the device is in a touch-forward operation mode, that may indicate that the user is physically near the device or is able to touch the device, and may therefore be able to easily enter a password via touch input or provide another authentication input. Accordingly, authentication may be requested. In some embodiments, passwords may be input or authentication may occur via voice input. In some embodiments, device location may be determined using a WiFi network identifier for a network to which the device is connected. If the device is connected to certain WiFi networks, the determination at block 1140 may be positive.

If it is determined that the device is in the docked operation mode at determination block 1140, the process flow may proceed to optional determination block 1160. At optional determination block 1160, a determination may be made as to whether the requested information is sensitive. For example, certain information may be determined to be sensitive based at least in part on a sensitivity classification of the information or an application that the information is associated with or sourced from. For example, a calendar application with the user's personal calendar information may be determined to be sensitive because it is user-specific information and/or because the calendar application is classified as a sensitive application. Sensitivity may be determined based at least in part on a sensitivity classification of applications. If it is determined that the requested information is not sensitive, the process flow may proceed to block 1130, at which the information may be caused to be presented, or may be presented at the device. Accordingly, although the device may be password protected, the information may be presented responsive to the voice command or verbal request, so as to avoid requiring the user to input the password or provide authentication since the information is not sensitive. An example of information that is not sensitive may include information related to research questions (e.g., what time do the Falcons play today?, when will the store open?, etc.) and/or requests that are not specific to a user account or a device.

In some embodiments, the device may receive an indication (e.g., from a remote server or other computer system, etc.) that the user is authorized to access applications on the device. The indication may include a confidence score that the user is authorized to access applications on the device. In some instances, the device or the remote server may determine a sensitivity classification of an application, such as the calendar application. The sensitivity classification may be indicative of a level of sensitivity of information associated with the application. The confidence score threshold may be determined for accessing the application and/or information associated with the application using the sensitivity classification.

If it is determined at optional determination block 1160 that the requested information is sensitive, the process flow may proceed to block 1170, at which a confidence score indicative of a likelihood that a user requesting the information is an authorized user may be determined using voice data. For example, if the information is determined to be associated with a user account, it may be determined to be sensitive. At block 1170, the voice data associated with the verbal request may be processed to determine a confidence score that indicates a likelihood that the user is authorized to receive the requested information. In some embodiments, the confidence score may be determined at a device, while in other instances, the confidence score may be determined at a remote server using the voice data, and an indication of the confidence score or a command to present or not present the information may be sent to the device. The voice data may be used to identify the speaker or user that said the verbal request or voice command, and the confidence score may be an indication of a likelihood that the user is actually the speaker identified.

Confidence scores may be determined by extracting or determining one or more attributes of a user's voice from the voice data, and comparing the results to a predetermined set of attributes of authorized users' voices. Attributes may include pitch, patterns, cadence, accents, volume, and/or other attributes. The process flow may proceed to determination block 1180.

At determination block 1180, a determination may be made as to whether the confidence score satisfies a threshold, such as a confidence score threshold. For example, after the confidence score is determined, the confidence score may be compared to a confidence score threshold to determine whether the confidence score is equal to or greater than the threshold. For example, the confidence score threshold may be 80, and a confidence score equal to or greater than 80 may satisfy the threshold. In some embodiments, the confidence score threshold may be dynamic and may change based at least in part on a sensitivity classification of the requested information. For example, for more sensitive information, the threshold may be relatively higher than for less sensitive information.

If it is determined at determination block 1180 that the confidence score does not satisfy the threshold, the process flow may proceed to block 1150, at which authentication is requested. If it is determined that the confidence score satisfies the threshold, the process flow may proceed to block 1130, at which the presentation of the information is caused, or the information is presented at the device. The information may be presented while the device is in the docked operation mode, in some embodiments. If no longer in a docked operation mode, the password may be requested.

At optional block 1190, a second verbal request to open an application while in the docked operating mode may be received. If such a request is received, for example "open my calendar," the process flow may proceed to block 1150, at which authentication is requested.

As a result, information that is requested from password protected devices or devices in locked states may be presented without authentication or requiring input of a password, depending on authentication or identification of a user using their voice, and optionally on a sensitivity of the requested information. A verbal request to open an application on a password protected or locked device, however, may be blocked in some embodiments. In other embodiments, applications may be opened using voice commands based at least in part on a confidence score that the user is an authorized user for accessing the device.

Figure 12:
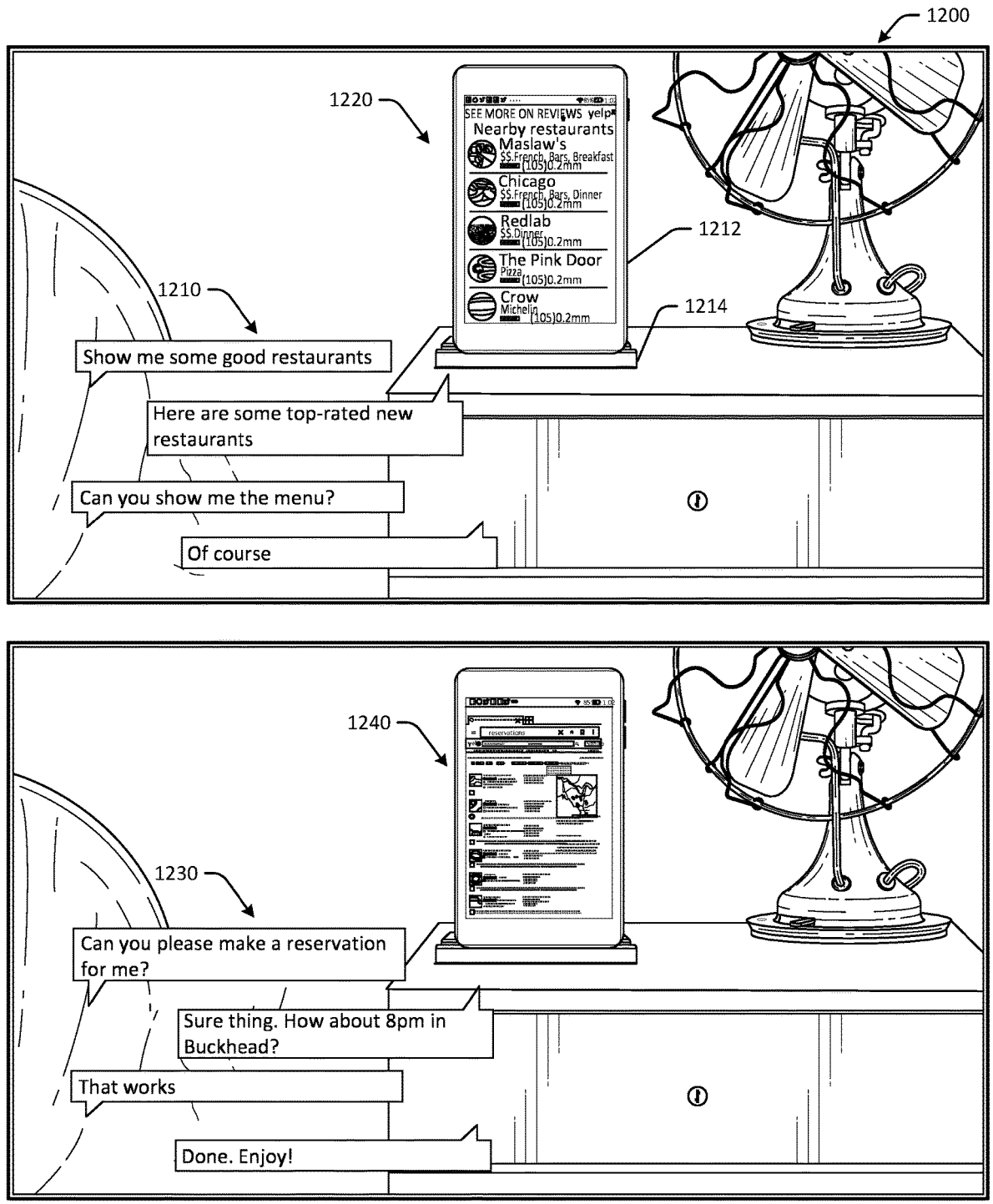
FIGS. 12-13 are schematic illustrations of example use cases for selective requests for passwords for voice-forward requests for information or applications in accordance with one or more example embodiments of the disclosure.
Figure 13:
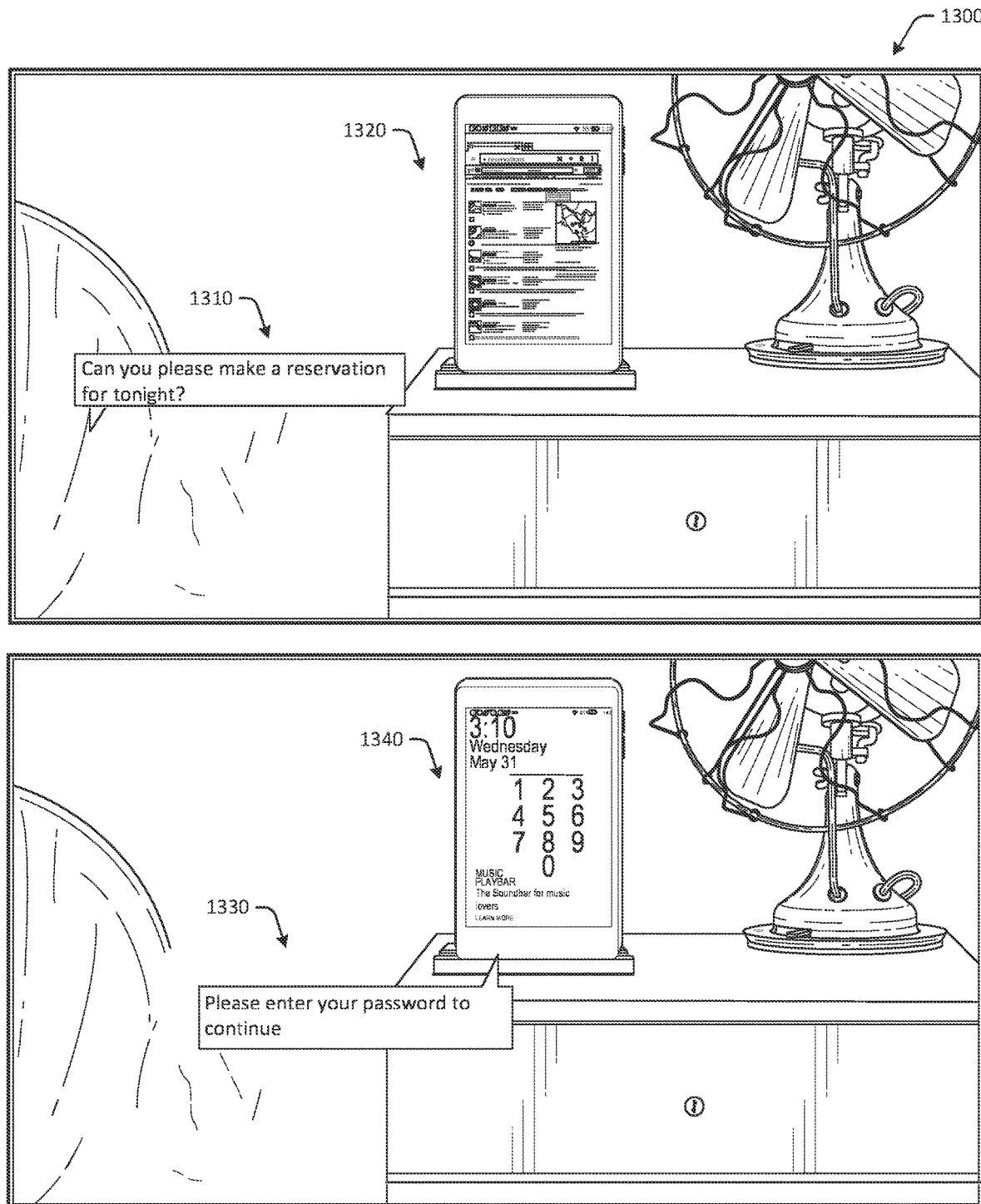

FIGS. 12-13 are schematic illustrations of example use cases 1200 for selective requests for passwords for voice-forward requests for information or applications in accordance with one or more example embodiments of the disclosure. In FIG. 12, at a first instance 1220, a device 1212 may be docked at a docking station 1214 and may be in a voice-forward operation mode. The device may be used by a user to locate restaurant reviews using voice input 1210. The user may be interacting with the device using voice commands. For example, the user may say "show me new restaurants." In response, the device may present information related to new restaurants, along with restaurant reviews. The user may select a restaurant for more information using a voice input. For example, the user may say "tell me more about Katana." Responsive to the request, the device may present specific content for the Katana restaurant listing. The user may request that a restaurant menu be presented.

At a second instance 1240, the user may provide a voice input 1230 of requesting that a reservation be made. This may be determined to be a sensitive request because it relates to user account-specific information. As a result, the device may attempt to identify the speaker using the voice input data. If the speaker cannot be identified, the device may prompt the user for a password prior to proceeding with the reservation. If the user can be identified as an authorized user, the device may bypass the password and proceed with making the reservation for the user without requesting a password. The device 1212 may determine that the user is an authorized user, for example based on analysis of the user's voice, and may proceed with making the reservation for the user, as illustrated in FIG. 12.

In another use case 1300 at FIG. 13, at a third instance 1320, the user may say "Can you make me a reservation for tonight?" If the speaker or user cannot be identified or otherwise be determined to be an authorized user, the device may prompt the user for a password prior to proceeding with the reservation.

At a fourth instance 1340, the device may audibly request a password 1330 and present a password input interface for the user to input a device password before proceeding with making the reservation. If the password is input or other authentication is confirmed, the device may transition to an unlocked state for a certain period of time before returning to a locked state.

To identify the user, the device may send a request for speaker identification to a remote server, where the response to the speaker identification request represents a likelihood that the user that spoke the voice input is authorized to access applications on the device or access information using the device. In some embodiments, attributes of at least a portion of voice data may be compared to attributes of a stored voice data sample. The confidence score may be indicative of a likelihood that the user is authorized to access the information.

In some embodiments, password bypass functionality may only be available when the device is docked or in a certain operation mode, while in other embodiments, password bypass functionality may always be available.

In some instances, a determination may be made, for example using a microphone or camera, that the user is physically present within proximity of the device prior to bypassing a password. Access to applications on a device, as opposed to services or information, may be prevented without a password in some embodiments.

One or more operations of the methods, process flows, or use cases of FIGS. 1-13 may have been described above as being performed by a user device, or more specifically, by one or more program module(s), applications, or the like executing on a device. It should be appreciated, however, that any of the operations of the methods, process flows, or use cases of FIGS. 1-13 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-13 may be described in the context of the illustrative devices, it should be appreciated that such operations may be implemented in connection with numerous other device configurations.

The operations described and depicted in the illustrative methods, process flows, and use cases of FIGS. 1-13 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 14:
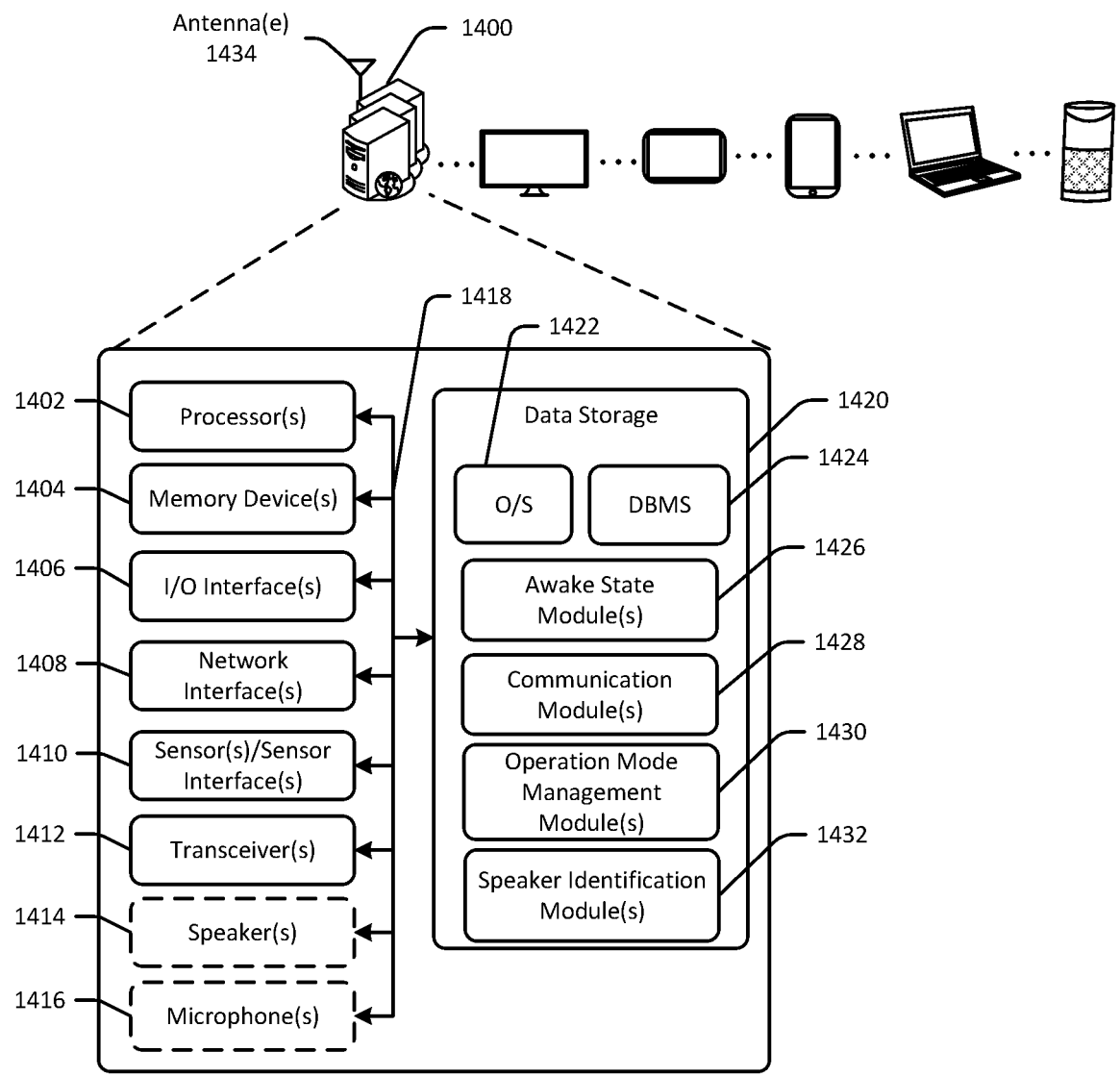
FIG. 14 is a schematic block diagram of an illustrative device in accordance with one or more example embodiments of the disclosure.

FIG. 14 is a schematic block diagram of an illustrative device 1400 in accordance with one or more example embodiments of the disclosure. The device 1400 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The device 1400 may correspond to an illustrative device configuration for the devices of FIGS. 1-13.

The device 1400 may be configured to communicate via one or more networks with one or more servers, search engines, user devices, or the like. In some embodiments, a single device or single group of devices may be configured to perform more than one type of device operation mode management functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 1400 may include one or more processors (processor(s)) 1402, one or more memory devices 1404 (generically referred to herein as memory 1404), one or more input/output (I/O) interface(s) 1406, one or more network interface(s) 1408, one or more sensor(s) or sensor interface(s) 1410, one or more transceivers 1412, one or more optional speaker(s) 1414, one or more optional microphones 1416, and data storage 1420. The device 1400 may further include one or more bus(es) 1418 that functionally couple various components of the device 1400. The device 1400 may further include one or more antenna(e) 1434 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1418 may include at least one of a system bus, a memory bus, an address bus, or a message bus, and may permit exchange of information (e.g., data (including computer-executable code), signaling, etc.) between various components of the device 1400. The bus(es) 1418 may include, without limitation, a memory bus or a memory controller, a peripheral bus, an accelerated graphics port, and so forth. The bus(es) 1418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1404 of the device 1400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1420 may include removable storage and/or non-removable storage including, but not limited to, magnetic storage, optical disk storage, and/or tape storage. The data storage 1420 may provide non-volatile storage of computer-executable instructions and other data. The memory 1404 and the data storage 1420, removable and/or non-removable, are examples of computer-readable storage media (CRSM) as that term is used herein.

The data storage 1420 may store computer-executable code, instructions, or the like that may be loadable into the memory 1404 and executable by the processor(s) 1402 to cause the processor(s) 1402 to perform or initiate various operations. The data storage 1420 may additionally store data that may be copied to memory 1404 for use by the processor(s) 1402 during the execution of the computer-executable instructions. Moreover, output data generated as a result of execution of the computer-executable instructions by the processor(s) 1402 may be stored initially in memory 1404, and may ultimately be copied to data storage 1420 for non-volatile storage.

More specifically, the data storage 1420 may store one or more operating systems (O/S) 1422; one or more database management systems (DBMS) 1424; and one or more program module(s), applications, engines, computer-executable code, scripts, or the like such as, for example, one or more awake state module(s) 1426, one or more communication module(s) 1428, one or more operation mode management module(s) 1430, and/or one or more speaker identification module(s) 1432. Some or all of these module(s) may be sub-module(s). Any of the components depicted as being stored in data storage 1420 may include any combination of software, firmware, and/or hardware. The software and/or firmware may include computer-executable code, instructions, or the like that may be loaded into the memory 1404 for execution by one or more of the processor(s) 1402. Any of the components depicted as being stored in data storage 1420 may support functionality described in reference to correspondingly named components earlier in this disclosure.

The data storage 1420 may further store various types of data utilized by components of the device 1400. Any data stored in the data storage 1420 may be loaded into the memory 1404 for use by the processor(s) 1402 in executing computer-executable code. In addition, any data depicted as being stored in the data storage 1420 may potentially be stored in one or more datastore(s) and may be accessed via the DBMS 1424 and loaded in the memory 1404 for use by the processor(s) 1402 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 14, the datastore(s) may include, for example, operating mode settings for various applications, authorized speaker or user data, docked operating mode settings, and other information.

The processor(s) 1402 may be configured to access the memory 1404 and execute computer-executable instructions loaded therein. For example, the processor(s) 1402 may be configured to execute computer-executable instructions of the various program module(s), applications, engines, or the like of the device 1400 to cause or facilitate various operations to be performed in accordance with one or more embodiments of the disclosure. The processor(s) 1402 may include any suitable processing unit capable of accepting data as input, processing the input data in accordance with stored computer-executable instructions, and generating output data. The processor(s) 1402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1402 may be capable of supporting any of a variety of instruction sets.

Referring now to functionality supported by the various program module(s) depicted in FIG. 14, the awake state module(s) 1426 may include computer-executable instructions, code, or the like that responsive to execution by one or more of the processor(s) 1402 may perform functions including, but not limited to, determining whether a computer processor is being held in an awake or always on state, determining whether a device component is being held in an awake state, determining whether an application is active or in a foreground of a computing environment, determining whether a display is being held in an awake state, determining active applications, and the like.

The communication module(s) 1428 may include computer-executable instructions, code, or the like that responsive to execution by one or more of the processor(s) 1402 may perform functions including, but not limited to, communicating with one or more devices, for example, via wired or wireless communication, communicating with remote servers, communicating with remote datastores, sending or receiving voice data, communicating with cache memory data, and the like.

The operation mode management module(s) 1430 may include computer-executable instructions, code, or the like that responsive to execution by one or more of the processor(s) 1402 may perform functions including, but not limited to, determining an active or current device operation mode, causing changes to device operation modes, canceling or defering automatic changes to device operation modes, determining voice commands or voice inputs, and the like.

The speaker identification module(s) 1432 may include computer-executable instructions, code, or the like that responsive to execution by one or more of the processor(s) 1402 may perform functions including, but not limited to, determining wake words, determining voice data or voice commands, identifying speakers of voice inputs, determining confidence scores, comparing attributes of voice input to stored data, and the like.

Referring now to other illustrative components depicted as being stored in the data storage 1420, the O/S 1422 may be loaded from the data storage 1420 into the memory 1404 and may provide an interface between other application software executing on the device 1400 and hardware resources of the device 1400. More specifically, the O/S 1422 may include a set of computer-executable instructions for managing hardware resources of the device 1400 and for providing common services to other application programs (e.g., managing memory allocation among various application programs). In certain example embodiments, the O/S 1422 may control execution of the other program module(s) to dynamically enhance characters for content rendering. The O/S 1422 may include any operating system now known or which may be developed in the future including, but not limited to, any server operating system, any mainframe operating system, or any other proprietary or non-proprietary operating system.

The DBMS 1424 may be loaded into the memory 1404 and may support functionality for accessing, retrieving, storing, and/or manipulating data stored in the memory 1404 and/or data stored in the data storage 1420. The DBMS 1424 may use any of a variety of database models (e.g., relational model, object model, etc.) and may support any of a variety of query languages. The DBMS 1424 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 1400 is a mobile device, the DBMS 1424 may be any suitable light-weight DBMS optimized for performance on a mobile device.

Referring now to other illustrative components of the device 1400, the input/output (I/O) interface(s) 1406 may facilitate the receipt of input information by the device 1400 from one or more I/O devices as well as the output of information from the device 1400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 1400 or may be separate. The I/O devices may further include, for example, any number of peripheral devices such as data storage devices, printing devices, and so forth.

The I/O interface(s) 1406 may also include an interface for an external peripheral device connection such as universal serial bus (USB), FireWire, Thunderbolt, Ethernet port or other connection protocol that may connect to one or more networks. The I/O interface(s) 1406 may also include a connection to one or more of the antenna(e) 1434 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The device 1400 may further include one or more network interface(s) 1408 via which the device 1400 may communicate with any of a variety of other systems, platforms, networks, devices, and so forth. The network interface(s) 1408 may enable communication, for example, with one or more wireless routers, one or more host servers, one or more web servers, and the like via one or more of networks.

The antenna(e) 1434 may include any suitable type of antenna depending, for example, on the communications protocols used to transmit or receive signals via the antenna (e) 1434. Non-limiting examples of suitable antennas may include directional antennas, non-directional antennas, dipole antennas, folded dipole antennas, patch antennas, multiple-input multiple-output (MIMO) antennas, or the like. The antenna(e) 1434 may be communicatively coupled to one or more transceivers 1412 or radio components to which or from which signals may be transmitted or received.

As previously described, the antenna(e) 1434 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1434 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1434 may be configured to transmit or receive radio frequency signals within any suitable frequency range forming part of the unlicensed portion of the radio spectrum.

The antenna(e) 1434 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1412 may include any suitable radio component(s) for—in cooperation with the antenna(e) 1434—transmitting or receiving radio frequency (RF) signals in the bandwidth and/or channels corresponding to the communications protocols utilized by the device 1400 to communicate with other devices. The transceiver(s) 1412 may include hardware, software, and/or firmware for modulating, transmitting, or receiving—potentially in cooperation with any of antenna(e) 1434— communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1412 may further include hardware, firmware, or software for receiving GNSS signals. The transceiver(s) 1412 may include any known receiver and baseband suitable for communicating via the communications protocols utilized by the device 1400. The transceiver(s) 1412 may further include a low noise amplifier (LNA), additional signal amplifiers, an analog-to-digital (A/D) converter, one or more buffers, a digital baseband, or the like.

The sensor(s)/sensor interface(s) 1410 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1414 may be any device configured to generate audible sound. The optional microphone(s) 1416 may be any device configured to receive analog sound input or voice data.

It should be appreciated that the program module(s), applications, computer-executable instructions, code, or the like depicted in FIG. 14 as being stored in the data storage 1420 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the device 1400, and/or hosted on other computing device(s) accessible via one or more networks, may be provided to support functionality provided by the program module(s), applications, or computer-executable code depicted in FIG. 14 and/or additional or alternate functionality. Further, functionality may be modularized differently such that processing described as being supported collectively by the collection of program module(s) depicted in FIG. 14 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 14 may be implemented, at least partially, in hardware and/or firmware across any number of devices.

It should further be appreciated that the device 1400 may include alternate and/or additional hardware, software, or firmware components beyond those described or depicted without departing from the scope of the disclosure. More particularly, it should be appreciated that software, firmware, or hardware components depicted as forming part of the device 1400 are merely illustrative and that some components may not be present or additional components may be provided in various embodiments. While various illustrative program module(s) have been depicted and described as software module(s) stored in data storage 1420, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Figure 15:
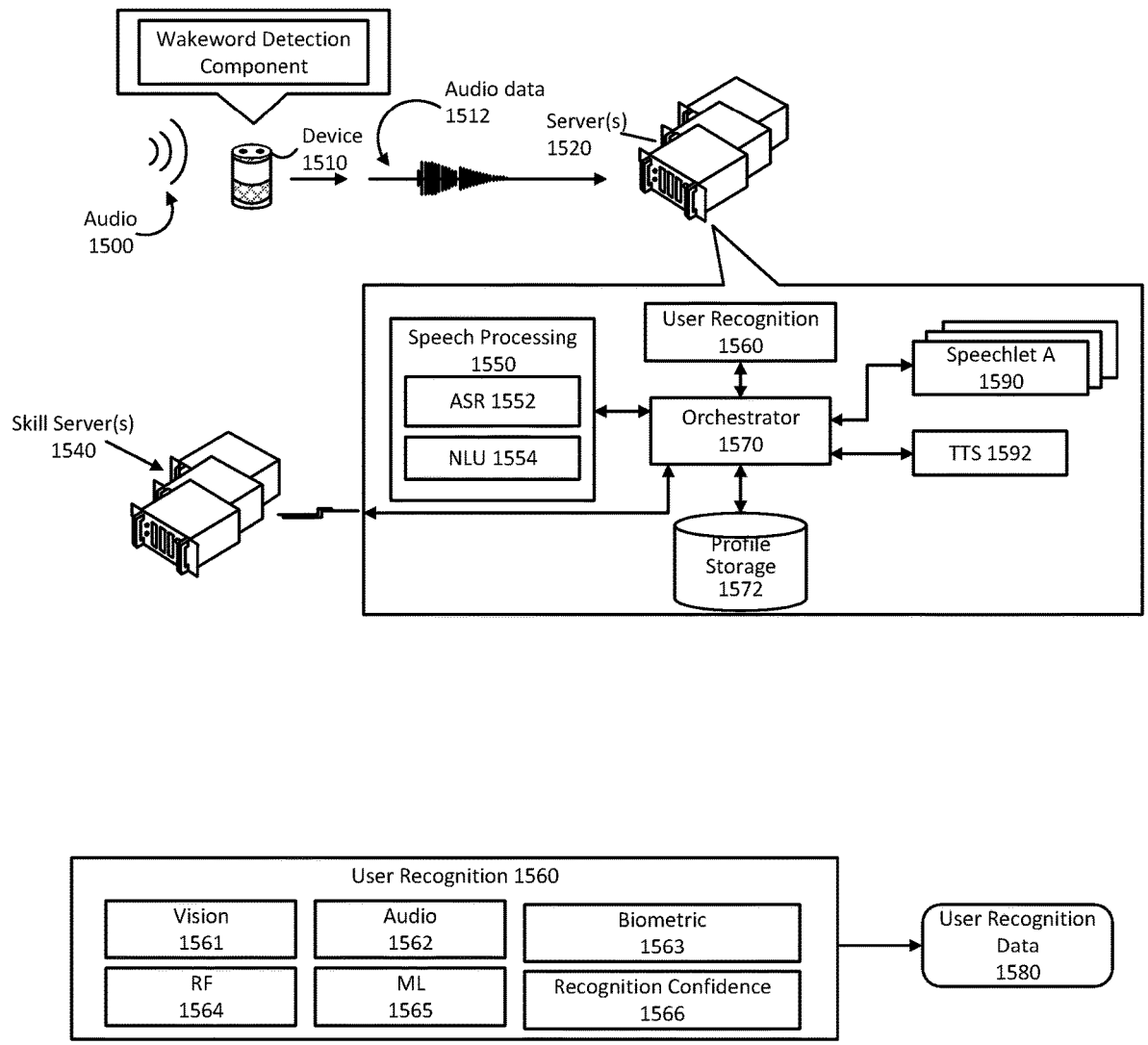
FIG. 15 is a schematic block diagram of components of a system in accordance with one or more example embodiments of the disclosure.

The system may operate using various components as described in FIG. 15. The various components illustrated FIG. 15 may be located on the same or different physical devices. Communication between various components illustrated in FIG. 15 may occur directly or across one or more network(s). The system of FIG. 15 may include one or more server(s) 1520 and one or more skill server(s) 1540 that may be in communication using one or more networks.

A device 1510 captures audio 1500 using an audio capture component, such as a microphone or array of microphones. The device 1510, using a wakeword detection component 1530, processes audio data corresponding to the audio 1500 to determine if a keyword (e.g., a wakeword) is detected in the audio data. Following detection of a wakeword, the device 1510 sends audio data 1512, corresponding to the audio 1500, to the one or more server(s) 1520.

Upon receipt by the server(s) 1520, the audio data 1512 may be sent to an orchestrator component 1570. The orchestrator component 1570 may include memory and logic that enables the orchestrator component 1570 to transmit various pieces and forms of data to various components of the system.

The orchestrator component 1570 sends the audio data 1512 to a speech processing component 1550. An ASR component 1552 of the speech processing component 1550 transcribes the audio data 1512 into one or more textual interpretations representing speech contained in the audio data 1512. The ASR component 1552 interprets the spoken utterance based on a similarity between the spoken utterance and pre-established language models. For example, the ASR component 1552 may compare the audio data 1512 with models for sounds (e.g., subword units such as phonemes) and sequences of sounds to identify words that match the sequence of sounds spoken in the utterance represented in the audio data 1512. The ASR component 1552 sends text data generated thereby to an NLU component 1554 of the speech processing component 1550. The text data sent from the ASR component 1552 to the NLU component 1554 may include a top scoring textual interpretation of the audio data 1512 or may include an N-best list including a group of textual interpretations of the audio data 1512, and potentially their respective scores.

The NLU component 1554 attempts to make a semantic interpretation of the phrases or statements represented in the text data input therein. That is, the NLU component 1554 determines one or more meanings associated with the phrases or statements represented in the text data based on individual words represented in the text data. The NLU component 1554 interprets a text string to derive an intent of the user (e.g., an action that the user desires be performed) as well as pertinent pieces of information in the text data that allow a device (e.g., the device 1510, the server(s) 1520, the skill server(s) 1540, etc.) to complete the intent. For example, if the text data corresponds to "play music," the NLU component 1554 may determine the user intended music to be output from one or more devices.

The server(s) 1520 may include a user recognition component 1560. The user recognition component 1560 may determine user that most likely spoke an input utterance as explained below.

The server(s) 1520 may include a profile storage 1572. The profile storage 1572 may include a variety of information related to individual devices, groups of devices, individual users, groups of users, etc. that interact with the system as described below.

The orchestrator component 1570 may send output from the NLU component 1554 (e.g., text data including tags attributing meaning to the words and phrases represented in the text data), and optionally output from the user recognition component 1560 and/or data from the profile storage 1572, to one or more speechlets 1590 and/or the one or more skill servers 1540 implementing one or more skills.

A "speechlet" may be software running on the server(s) 1520 that is akin to a software application running on a traditional desktop computer. That is, a speechlet 1590 may enable the server(s) 1520 to execute specific functionality in order to provide data or produce some other output requested by a user. The server(s) 1520 may be configured with more than one speechlet 1590. For example, a weather service speechlet may enable the server(s) 1520 to provide weather information, a car service speechlet may enable the server(s) 1520 to book a trip with respect to a taxi or ride sharing service, an order pizza speechlet may enable the server(s) 1520 to order a pizza with respect to a restaurant's online ordering system, etc. A speechlet may operate in conjunction between the server(s) 1520 and other devices such as a local device 1510 in order to complete certain functions. Inputs to the speechlet may come from speech processing interactions or through other interactions or input sources. In some embodiments, speechlets may send signals or data to client devices that cause the client device to activate a voice-forward operating mode or a tablet operating mode. A current operating mode of a client device may be stored at the server 1520. In some embodiments, a tablet-management speechlet may be included and may send a directive or command to a client device, such as a tablet, that causes the device to activate or switch into certain operating modes.

A speechlet may include a "skill." A skill may be software running on a skill server(s) 1540 that is akin to an application. That is, a skill may enable the skill server(s) 1540 to execute specific functionality in order to provide data or produce some other output requested by a user. A skill server(s) 1540 may be configured with more than one skill. For example, a weather service skill may enable the skill server(s) 1540 to provide weather information to the server(s) 1540, a car service skill may enable the skill server(s) 1540 to book a trip with respect to a taxi or ride sharing service, an order pizza skill may enable the skill server(s) 1540 to order a pizza with respect to a restaurant's online ordering system, etc. A skill may operate in conjunction between the skill server(s) 1540 and other devices such as the server(s) 1540 or local device 110 in order to complete certain functions. Inputs to the skill may come from speech processing interactions or through other interactions or input sources. Skills may be associated with certain client devices while the client device is in a voice-forward mode. For example, while in a voice-forward mode, a client device may be associated with a music skill that can be used to cause playback of music using voice commands received at the client device.

The functions provided by one or more speechlets 1590 may overlap or be different from the functions provided by one or more skills. Speechlets 1590 may be implemented in some combination of hardware, software, firmware, etc.

The orchestrator component 1570 may choose which speechlet(s) 1590 and/or skill server(s) 1540 to send data to based on the output of the NLU component 1554. In an example, the orchestrator component 1570 may send data to a music playing speechlet(s) 1590 and/or skill server(s) 1540 when the NLU component 1554 outputs text data associated with a command to play music. In another example, the orchestrator component 1570 may send data to a weather speech(s) 1590 and/or skill server(s) 1540 when the NLU component 1554 outputs text data associated with a command to output weather information. In yet another example, the orchestrator component 1570 may send data to a search engine speechlet(s) 1590 and/or skill server(s) 1540 when the NLU component 1554 outputs text data associated with a command to obtain search results.

Speechlets 1590 and skill servers 1540 may output text data, which the orchestrator component 1570 may send to a text-to-speech (TTS) component 1592. The TTS component 1592 may synthesize speech corresponding to the text data input therein. The orchestrator component 1570 or other component of the server(s) 1540 may send audio data synthesized by the TTS component 1592 (or other output data from speechlet(s) 1590 or skill server(s) 1540) to the device 1510 (or another device including a speaker and associated with the same user ID or customer ID) for output to one or more users.

The TTS component 1592 may perform speech synthesis using one or more different methods. In one method of synthesis called unit selection, the TTS component 1592 matches text data against a database of recorded speech. Matching units are selected and concatenated together to form audio data. In another method of synthesis called parametric synthesis, the TTS component 1592 varies parameters such as frequency, volume, and noise to create an artificial speech waveform output. Parametric synthesis uses a computerized voice generator, sometimes called a vocoder.

The various components may exist in software, hardware, firmware, or some combination thereof.

The user recognition component 1560 may recognize one or more users using a variety of data. As illustrated in FIG. 15, the user recognition component 1560 may include one or more subcomponents including a vision component 1561, an audio component 1562, a biometric component 1563, a radio frequency (RF) component 1564, a machine learning (ML) component 1565, and a recognition confidence component 1566. In some instances, the user recognition component 1560 may monitor data and determinations from one or more subcomponents to determine an identity of one or more users in an environment. The user recognition component 1560 may output user recognition data 1580, which may include a user identifier associated with a user the system believes is interacting with the system. The user recognition data 1580 may be used to inform NLU component 1554 processes as well as processing performed by speechlets 1590, skill servers 1540, routing of output data, permission access to further information, etc.

The vision component 1561 may receive data from one or more sensors capable of providing images (e.g., cameras) or sensors indicating motion (e.g., motion sensors). The vision component 1561 can perform facial recognition or image analysis to determine an identity of a user and to associate that identity with a user profile associated with the user. In some instances, when a user is facing a camera, the vision component 1561 may perform facial recognition and identify the user with a high degree of confidence. In other instances, the vision component 1561 may have a low degree of confidence of an identity of a user, and the user recognition component 1560 may utilize determinations from additional components to determine an identity of a user. The vision component 1561 can be used in conjunction with other components to determine an identity of a user. For example, the user recognition component 1560 may utilize user data from the vision component 1516 with data from the audio component 1562 to identify what user's face appears to be speaking at the same time audio is captured by a device the user is facing for purposes of identifying a user who spoke an utterance.

The system may include biometric sensors that transmit data to the biometric component 1563. For example, the biometric component 1563 may receive data corresponding to fingerprints, iris or retina scans, thermal scans, weights of users, a size of a user, pressure (e.g., within floor sensors), etc., and may determine a biometric profile corresponding to a user. The biometric component 1563 may distinguish between a user and sound from a television, for example. Thus, the biometric component 1563 may incorporate biometric information into a confidence level for determining an identity of a user. Biometric information output by the biometric component 1563 can be associated with a specific user profile such that the biometric information uniquely identifies a user profile of a user.

The RF component 1564 may use RF localization to track devices that a user may carry or wear. For example, a user (and a user profile associated with the user) may be associated with a computing device. The computing device may emit RF signals (e.g., Wi-Fi, Bluetooth®, etc.). A device may detect the signal and indicate to the RF component 1564 the strength of the signal (e.g., as a received signal strength indication (RSSI)). The RF component 1564 may use the RSSI to determine an identity of a user (with an associated confidence level). In some instances, the RF component 1564 may determine that a received RF signal is associated with a mobile device that is associated with a particular user.

In some instances, a device 1510 may include some RF or other detection processing capabilities so that a user who speaks an utterance may scan, tap, or otherwise acknowledge his/her personal device (such as a phone) to the device

1510. In this manner, the user may "register" with the system for purposes of the system determining who spoke a particular utterance. Such a registration may occur prior to, during, or after speaking of an utterance.

The ML component 1565 may track the behavior of various users in the environment as a factor in determining a confidence level of the identity of the user. By way of example, a user may adhere to a regular schedule such that the user is outside the environment during the day (e.g., at work or at school). In this example, the ML component 1565 would factor in past behavior and/or trends into determining the identity of the user that spoke an utterance to the system. Thus, the ML component 1565 may user historical data and/or usage patterns over time to increase or decrease a confidence level of an identity of a user.

In some instances, the recognition confidence component 1566 receives determinations from the various components, and may determine a final confidence level associated with the identity of a user. In some instances, the confidence level may determine whether an action is performed. For example, if a user request includes a request to unlock a door, a confidence level may need to be above a threshold that may be higher than a confidence level needed to perform a user request associated with playing a playlist or resuming a location in an audiobook. The confidence level or other score data may be included in the user recognition data 1580.

The audio component 1562 may receive data from one or more sensors capable of providing an audio signal (e.g., the device 1510, one or more microphones, etc.) to facilitate recognizing a user. The audio component 1562 may perform audio recognition on an audio signal to determine an identity of the user and an associated user profile. In some instances, aspects of the server(s) 1520 may be configured at a computing device (e.g., a local server) within the environment 202. Thus, in some instances, the audio component 1562 operating on a computing device in the environment may analyze all sound within the environment (e.g., without requiring a wake word) to facilitate recognizing a user. In some instances, the audio component 1562 may perform voice recognition to determine an identity of a user.

The audio component 1562 may also determine whether a user corresponds to a child or not a child based on audio characteristics. The audio component 1562 may include a model trained with respect to speech characteristics common to children. Using the trained model, the audio component 1562 may make a binary determination regarding whether the user that spoke the command is a child. The trained model(s) may determine a child is speaking based on acoustic properties of audio (e.g., pitch, prosody, energy) as well as other data/characteristics (e.g., vocabulary, sentence structure, direction of where audio of an utterance is received from (since children are shorter than adults)).

Child detection can be performed independently of user identity. For example, the system may use user recognition techniques and not be able to identify the specific speaking user, but may still be able to tell that the speaking user is a child or non-adult.

The audio component 1562 may also perform user identification based on information relating to a spoken utterance input into the system for speech processing. For example, the audio component 1562 may take as input the audio data 1512 and/or output data from the ASR component 1552. The audio component 1562 may determine scores indicating whether the command originated from particular users. For example, a first score may indicate a likelihood that the command originated from a first user, a second score may indicate a likelihood that the command originated from a second user, etc. The audio component 1562 may perform user recognition by comparing speech characteristics in the audio data 1512 to stored speech characteristics of users.

Figure 16:
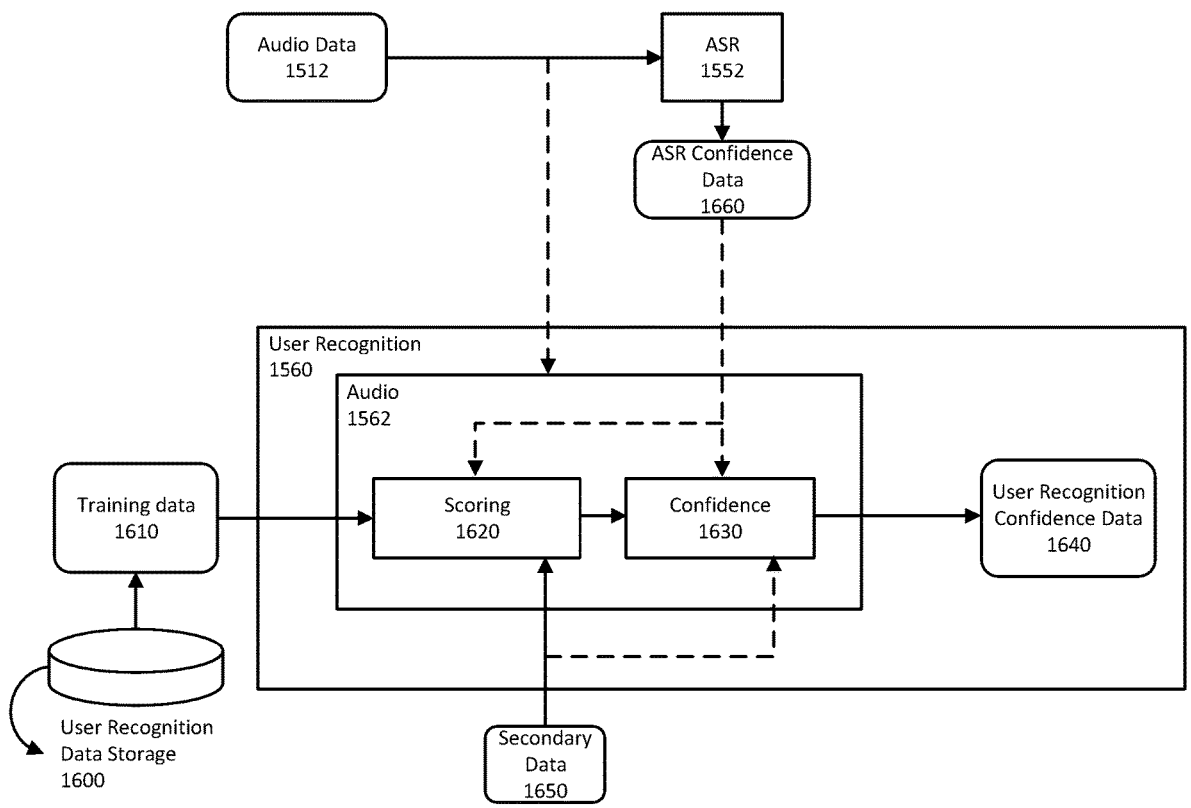
FIG. 16 is a system flow diagram illustrating user recognition in accordance with one or more example embodiments of the disclosure.

FIG. 16 illustrates the audio component 1562 of the user recognition component 1560 performing user recognition using audio data, for example input audio data 1512 corresponding to an input utterance. In addition to outputting text data as described above, the ASR component 1552 may also output ASR confidence data 1660, which is passed to the user recognition component 1560. The audio component 1562 performs user recognition using various data including the audio data 1512, training data 1610 corresponding to sample audio data corresponding to known users, the ASR confidence data 1660, and secondary data 1650. The audio component 1562 may output user recognition confidence data 1640 that reflects a certain confidence that the input utterance was spoken by one or more particular users. The user recognition confidence data 1640 may include an indicator of a verified user (such as a user ID corresponding to the speaker of the utterance) along with a confidence value corresponding to the user ID, such as a numeric value or binned value as discussed below. The user recognition confidence data 1640 may be used by various components, including other components of the user recognition component 1560 to recognize a user.

The training data 1610 may be stored in a user recognition data storage 1600. The user recognition data storage 1600 may be stored by the server(s) 1540, or may be a separate device. Further, the user recognition data storage 1600 may be part of a user profile in the profile storage 1572. The user recognition data storage 1600 may be a cloud-based storage. The training data 1610 stored in the user recognition data storage 1600 may be stored as waveforms and/or corresponding features/vectors. The training data 1610 may correspond to data from various audio samples, each audio sample associated with a known user and/or user identity. The audio samples may correspond to voice profile data for one or more users. For example, each user known to the system may be associated with some set of training data 1610/voice profile data for the known user. Thus, the training data 1610 may include a biometric representation of a user's voice. The audio component 1562 may then use the training data 1610 to compare against incoming audio data 1512 to determine the identity of a user speaking an utterance. The training data 1610 stored in the user recognition data storage 1600 may thus be associated with multiple users of multiple devices. Thus, the training data 1610 stored in the user recognition data storage 1600 may be associated with both a user that spoke the respective utterance, as well as the device 1510 that captured the respective utterance.

To perform user recognition, the audio component 1562 may determine the device 1510 from which the audio data 1512 originated. For example, the audio data 1512 may include a tag or other metadata indicating the device 1510. Either the device 1510 or the server(s) 1540 may tag the audio data 1512 as such. The user recognition component 1560 may send a signal to the user recognition data storage 1600, with the signal requesting only training data 1610 associated with known users of the device 1510 from which the audio data 1512 originated. This may include accessing a user profile(s) associated with the device 1510 and then only inputting training data 1610 associated with users corresponding to the user profile(s) of the device 1510. This limits the universe of possible training data the audio component 1562 should consider at runtime when recognizing a user and thus decreases the amount of time to perform user recognition by decreasing the amount of training data 1610 needed to be processed. Alternatively, the user recognition component 1560 may access all (or some other subset of) training data 1610 available to the system. Alternatively, the audio component 1562 may access a subset of training data 1610 of users potentially within the environment of the device 1510 from which the audio data 1512 originated, as may otherwise have been determined by the user recognition component 1560.

If the audio component 1562 receives training data 1610 as an audio waveform, the audio component 1562 may determine features/vectors of the waveform(s) or otherwise convert the waveform into a data format that can be used by the audio component 1562 to actually perform the user recognition. The audio component 1562 may then identify the user that spoke the utterance in the audio data 1512 by comparing features/vectors of the audio data 1512 to training features/vectors (either received from the user recognition data storage 1600 or determined from training data 1610 received from the user recognition data storage 1600).

The audio component 1562 may include a scoring component 1620 which determines respective scores indicating whether the input utterance (represented by the audio data 1512) was spoken by particular users (represented by the training data 1610). The audio component 1562 may also include a confidence component 1630 that determines an overall confidence as the accuracy of the user recognition operations (such as those of the scoring component 1620) and/or an individual confidence for each user potentially identified by the scoring component 1620. The output from the scoring component 1620 may include scores for all users with respect to which user recognition was performed (e.g., all users associated with the device 1510). For example, the output may include a first score for a first user, a second score for a second user, and third score for a third user, etc. Although illustrated as two separate components, the scoring component 1620 and confidence component 1630 may be combined into a single component or may be separated into more than two components.

The scoring component 1620 and confidence component 1630 may implement one or more trained machine learning models (such neural networks, classifiers, etc.) as known in the art. For example, the scoring component 1620 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 1620 may also use other techniques such as GMMs, generative Bayesian models, or the like, to determine similarity scores.

The confidence component 1630 may input various data including information about the ASR confidence data 1660, utterance length (e.g., number of frames or time of the utterance), audio condition/quality data (such as signal-to-interference data or other metric data), fingerprint data, image data, or other factors to consider how confident the audio component 1562 is with regard to the scores linking users to the input utterance. The confidence component 1630 may also consider the similarity scores and user IDs output by the scoring component 1620. Thus, the confidence component 1630 may determine that a lower ASR confidence represented in the ASR confidence data 1660, or poor input audio quality, or other factors, may result in a lower confidence of the audio component 1562. Whereas a higher ASR confidence represented in the ASR confidence data 1660, or better input audio quality, or other factors, may result in a higher confidence of the audio component 1562. Precise determination of the confidence may depend on configuration and training of the confidence component 1630 and the models used therein. The confidence component 1630 may operate using a number of different machine learning models/techniques such as GMM, neural networks, etc. For example, the confidence component 1630 may be a classifier configured to map a score output by the scoring component 1620 to a confidence.

The audio component 1562 may output user recognition confidence data 1640 specific to a single user, or multiple users in the form of an N-best list. For example, the audio component 1562 may output user recognition confidence data 1640 with respect to each user indicated in the profile associated with the device 1510 from which the audio data 1512 was received. The audio component 1562 may also output user recognition confidence data 1640 with respect to each user potentially in the location of the device 1510 from which the audio data 1512 was received.

The user recognition confidence data 1640 may include particular scores (e.g., 0.0-1.0, 0-1000, or whatever scale the system is configured to operate). Thus, the system may output an N-best list of potential users with confidence scores (e.g., John-0.2, Jane-0.8). Alternatively or in addition, the user recognition confidence data 1640 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John-low, Jane-high). Combined binned and confidence score outputs are also possible. Rather than a list of users and their respective scores and/or bins, the user recognition confidence data 1640 may only include information related to the top scoring user as determined by the audio component 1562. The scores and bins may be based on information determined by the confidence component 1630. The audio component 1562 may also output a confidence value that the scores/bins are correct, where the confidence value indicates how confident the audio component 1562 is in the output results. This confidence value may be determined by the confidence component 1630.

The confidence component 1630 may determine individual user confidences and differences between user confidences when determining the user recognition confidence data 1640. For example, if a difference between a first user's confidence score and a second user's confidence score is large, and the first user's confidence score is above a threshold, then the audio component 1562 is able to recognize the first user as the user that spoke the utterance with a much higher confidence than if the difference between the users' confidences were smaller.

The audio component 1562 may perform certain thresholding to avoid incorrect user recognition results being output. For example, the audio component 1562 may compare a confidence score output by the confidence component 1630 to a confidence threshold. If the confidence score is not above the confidence threshold (for example, a confidence of "medium" or higher), the user audio component 1562 may not output user recognition confidence data 1640, or may only include in that data 1640 an indication that a user speaking the utterance could not be verified. Further, the audio component 1562 may not output user recognition confidence data 1640 until enough input audio data 1512 is accumulated and processed to verify the user above a threshold confidence. Thus, the audio component 1562 may wait until a sufficient threshold quantity of audio data 1512 of the utterance has been processed before outputting user recognition confidence data 1640. The quantity of received audio data 1512 may also be considered by the confidence component 1630.

The audio component 1562 may be defaulted to output binned (e.g., low, medium, high) user recognition confidence data 1640. However, such may be problematic from the speechlet(s) 1590 and skill server(s) 1540 perspectives. For example, if the audio component 1562 computes a single binned confidence for multiple users, a speechlet(s) 1590/skill server(s) 1540 may not be able to determine which user to determine content with respect to. In this situation, the audio component 1562 may be configured to override its default setting and output user recognition confidence data 1640 including values (e.g., 0.0-1.0) associated with the users associated with the same binned confidence. This enables the speechlet(s) 1590/skill server(s) 1540 to select content associated with the user associated with the highest confidence value. The user recognition confidence data 1640 may also include the user IDs corresponding to the potential user(s) who spoke the utterance.

The user recognition component 1560 may combine data from components to determine the identity of a particular user. As part of its audio-based user recognition operations, the audio component 1562 may use secondary data 1650 to inform user recognition processing. Thus, a trained model or other component of the audio component 1562 may be trained to take secondary data 1650 as an input feature when performing recognition. Secondary data 1650 may include a wide variety of data types depending on system configuration and may be made available from other sensors, devices, or storage such as user profile data, etc. The secondary data 1650 may include a time of day at which the audio data 1512 was captured, a day of a week in which the audio data 1512 was captured, the text data output by the ASR component 1552, NLU results data, and/or other data.

In one example, secondary data 1650 may include image data or video data. For example, facial recognition may be performed on image data or video data received corresponding to the received audio data 1512. Facial recognition may be performed by the vision component 1561, or by another component of the server(s) 1540. The output of the facial recognition process may be used by the audio component 1562. That is, facial recognition output data may be used in conjunction with the comparison of the features/vectors of the audio data 1512 and training data 1610 to perform more accurate user recognition.

The secondary data 1650 may also include location data of the device 1510. The location data may be specific to a building within which the device 1510 is located. For example, if the device 1510 is located in user A's bedroom, such location may increase user recognition confidence data associated with user A, but decrease user recognition confidence data associated with user B.

The secondary data 1650 may also include data related to the profile of the device 1510. For example, the secondary data 1650 may further include type data indicating a type of the device 1510. Different types of devices may include, for example, a smart watch, a smart phone, a tablet computer, and a vehicle. The type of device may be indicated in the profile associated with the device. For example, if the device 1510 from which the audio data 1512 was received is a smart watch or vehicle belonging to user A, the fact that the device 1510 belongs to user A may increase user recognition confidence data associated with user A, but decrease user recognition confidence data associated with user B. Alternatively, if the device 1510 from which the audio data 1512 was received is a public or semi-public device, the system may provide user information about the location of the device to cross-check other potential user locating information (such as calendar data, etc.) to potentially narrow the potential users to be recognized with respect to the audio data 1512.

The secondary data 1650 may additionally include geographic coordinate data associated with the device 1510. For example, a profile associated with a vehicle may indicate multiple users (e.g., user A and user B). The vehicle may include a global positioning system (GPS) indicating latitude and longitude coordinates of the vehicle when the audio data 1512 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the device 1510. The global coordinates and associated locations may be associated with respective users in the user profile storage 1572.

The secondary data 1650 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 1650 and considered by the audio component 1562. If a mobile device (such as a phone, Tile, dongle, or other device) known to be associated with a particular user is detected proximate to (for example physically close to, connected to the same WiFi network as, or otherwise nearby) the device 1510, this may be reflected in the secondary data 1650 and considered by the audio component 1562.

The user recognition confidence data 1640 output by the audio component 1562 may be used by other components of the user recognition component 1560 and/or may be sent to one or more speechlets 1590, skill servers 1540, the orchestrator 330, or to other components. The speechlet(s) 1590/skill server(s) 1540 that receives the NLU results and the user recognition confidence score data 1640 (or other user recognition results as output by the user recognition component 1560) may be determined by the server(s) 1540 as corresponding to content responsive to the utterance in the audio data 1512. For example, if the audio data 1512 includes the utterance "Play my music," the NLU results and user recognition confidence data 1640 (or other output user recognition data) may be sent to a music playing speechlet(s) 1590/skill server(s) 1540.

Figure 17:
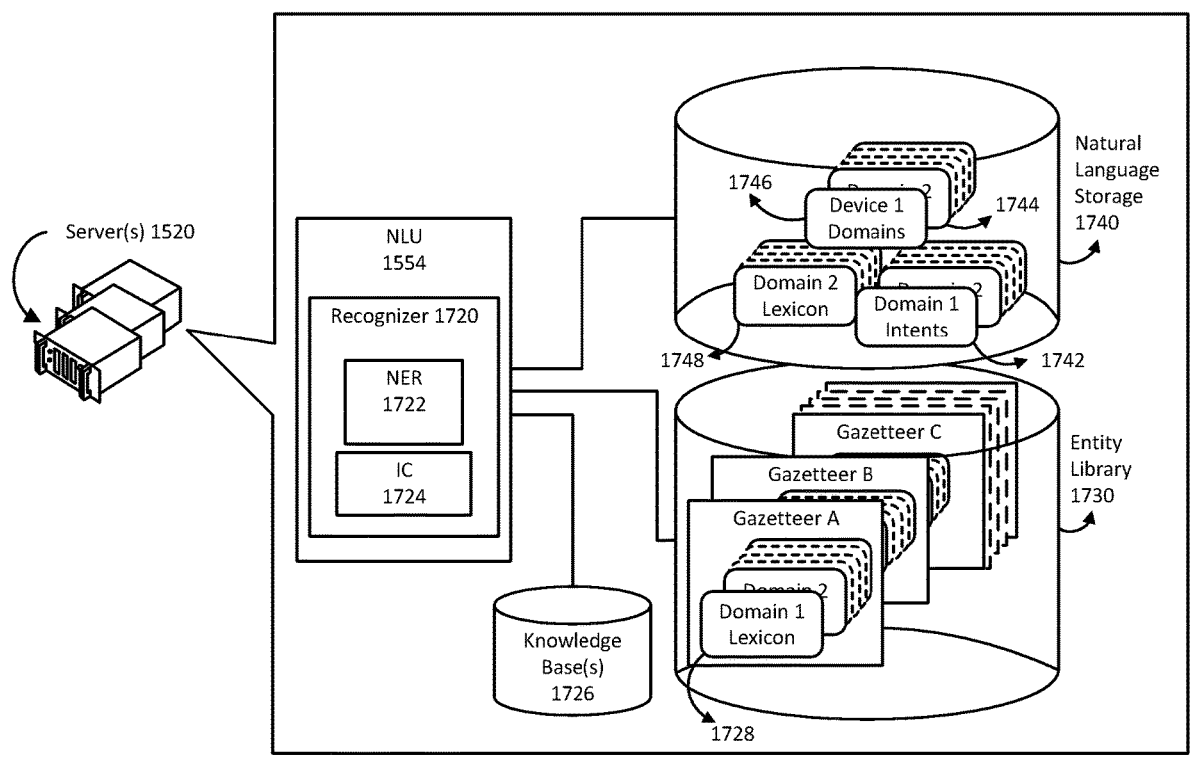
FIGS. 17-18 are schematic diagrams of how natural language processing may be performed in accordance with one or more example embodiments of the disclosure.

FIG. 17 illustrates how NLU processing is performed on audio data. Generally, the NLU component 1554 attempts to make a semantic interpretation of text represented in text data (e.g., ASR results output by the ASR component 1552). That is, the NLU component 1554 determines the meaning behind the text represented in text data based on the individual words. The NLU component 1554 interprets text to derive an intent or a desired action from an utterance as well as the pertinent pieces of information in the text that allow a device (e.g., device 1510, server(s) 1540, speechlet(s) 1590, skill server(s) 1540) to complete that action.

The NLU component 1554 may process text data including several textual interpretations of a single utterance. For example, if the ASR component 1552 outputs ASR results including an N-best list of textual interpretations, the NLU component 1554 may process the text data with respect to all (or a portion of) the textual interpretations represented therein.

The NLU component 1554 may include one or more recognizers 1720. Each recognizer 1720 may be associated with a different speechlet 1590. The NLU component 1554 may determine a speechlet 1590 potentially associated with a textual interpretation represented in text data input thereto in order to determine the proper recognizer 1720 to process the textual interpretation. The NLU component 1554 may determine a single textual interpretation is potentially associated with more than one speechlet 1590. Multiple recognizers 1720 may be functionally linked (e.g., a telephony/communications recognizer and a calendaring recognizer may utilize data from the same contact list).

If the NLU component 1554 determines a specific textual interpretation is potentially associated with multiple speechlets 1590, the recognizers 1720 associated with the speechlets 1590 may process the specific textual interpretation in parallel. For example, if a specific textual interpretation potentially implicates both a communications speechlet and a music speechlet, a recognizer associated with the communications speechlet may process the textual interpretation in parallel, or substantially in parallel, with a recognizer associated with the music speechlet processing the textual interpretation. The output generated by each recognizer may be scored, with the overall highest scored output from all recognizers ordinarily being selected to be the correct result.

The NLU component 1554 may communicate with various storages to determine the potential speechlet(s) associated with a textual interpretation. The NLU component 1554 may communicate with an NLU storage 1740, which includes databases of devices (1746) identifying speechlets associated with specific devices. For example, the device 1510 may be associated with speechlets for music, calendaring, contact lists, device-specific communications, etc. In addition, the NLU component 1554 may communicate with an entity library 1730, which includes database entries about specific services on a specific device, either indexed by device ID, user ID, or group user ID, or some other indicator.

Each recognizer 1720 may include a named entity recognition (NER) component 1722. The NER component 1722 attempts to identify grammars and lexical information that may be used to construe meaning with respect to a textual interpretation input therein. The NER component 1722 identifies portions of text represented in text data input into the NLU component 1554 that correspond to a named entity that may be recognizable by the system. The NER component 1722 (or other component of the NLU component 1554) may also determine whether a word refers to an entity that is not explicitly mentioned in the utterance text, for example "him," "her," "it" or other anaphora, exophora, or the like.

Each recognizer 1720, and more specifically each NER component 1722, may be associated with a particular grammar model and/or database 1748, a particular set of intents/actions 1742, and a particular personalized lexicon 1728. Each gazetteer may include speechlet-indexed lexical information associated with a particular user and/or device. For example, the Gazetteer A includes speechlet-indexed lexical information 1728. A user's music speechlet lexical information might include album titles, artist names, and song names, for example, whereas a user's contact-list lexical information might include the names of contacts. Since every user's music collection and contact list is presumably different, this personalized information improves entity resolution.

An NER component 1722 applies grammar models 1748 and lexical information 1728 associated with the speechlet (associated with the recognizer 1720 implementing the NER component 1722) to determine a mention one or more entities in a textual interpretation input therein. In this manner, the NER component 1722 identifies "slots" (i.e., particular words in a textual interpretation) that may be needed for later command processing. The NER component 1722 may also label each slot with a type of varying levels of specificity (e.g., noun, place, city, artist name, song name, etc.).

Each grammar model 1748 includes the names of entities (i.e., nouns) commonly found in speech about the particular speechlet to which the grammar model 1748 relates, whereas the lexical information 1728 is personalized to the user(s) and/or the device 1510 from which the audio data 1512 originated. For example, a grammar model 1748 associated with a shopping speechlet may include a database of words commonly used when people discuss shopping.

A downstream process called named entity resolution actually links a portion of text to an actual specific entity known to the system. To perform named entity resolution, the NLU component 1554 may utilize gazetteer information stored in an entity library storage 1730. The gazetteer information may be used to match text represented in text data output by the ASR component 1552 with different entities, such as song titles, contact names, etc. Gazetteers may be linked to users (e.g., a particular gazetteer may be associated with a specific user's music collection), may be linked to certain speechlet categories (e.g., shopping, music, video, communications, etc.), or may be organized in a variety of other ways.

Each recognizer 1720 may also include an intent classification (IC) component 1724. The IC component 1724 parses an input textual interpretation to determine an intent(s) of the speechlet associated with the recognizer 1720 that potentially corresponds to the textual interpretation. An intent corresponds to an action to be performed that is responsive to the command represented by the textual interpretation. The IC component 1724 may communicate with a database 1742 of words linked to intents. For example, a music intent database may link words and phrases such as "quiet," "volume off," and "mute" to a "mute" intent. The IC component 1724 identifies potential intents by comparing words in the textual interpretation to the words and phrases in an intents database 1742 associated with the speechlet that is associated with the recognizer 1720 implementing the IC component 1724.

The intents identifiable by a specific IC component 1724 are linked to speechlet-specific (i.e., the speechlet associated with the recognizer 1720 implementing the IC component 1724) grammar frameworks 1748 with "slots" to be filled. Each slot of a grammar framework 1748 corresponds to a portion of the text interpretation that the system believes corresponds to an entity. For example, a grammar framework 1748 corresponding to a<PlayMusic>intent may correspond to textual interpretation sentence structures such as "Play {Artist Name}," "Play {Album Name}," "Play {Song name}," "Play {Song name} by {Artist Name}," etc. However, to make resolution more flexible, grammar frameworks

1748 may not be structured as sentences, but rather based on associating slots with grammatical tags.

For example, an NER component 1722 may parse a textual interpretation to identify words as subject, object, verb, preposition, etc. based on grammar rules and/or models prior to recognizing named entities in the textual interpretation. An IC component 1724 (implemented by the same recognizer 1720 as the NER component 1722) may use the identified verb to identify an intent. The NER component 1722 may then determine a grammar model 1748 associated with the identified intent. For example, a grammar model 1748 for an intent corresponding to <PlayMusic>may specify a list of slots applicable to play the identified "object" and any object modifier (e.g., a prepositional phrase), such as {Artist Name}, {Album Name}, {Song name}, etc. The NER component 1722 may then search corresponding fields in a lexicon 1728 associated with the speechlet associated with the recognizer 1720 implementing the NER component 1722, attempting to match words and phrases in the textual interpretation the NER component 1722 previously tagged as a grammatical object or object modifier with those identified in the lexicon 1728.

An NER component 1722 may perform semantic tagging, which is the labeling of a word or combination of words according to their type/semantic meaning. An NER component 1722 may parse a textual interpretation heuristic grammar rules, or a model may be constructed using techniques such as hidden Markov models, maximum entropy models, log linear models, conditional random fields (CRF), and the like. For example, an NER component 1722 implemented by a music speechlet recognizer 1720 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 1722 identifies "Play" as a verb based on a word database associated with the music speechlet, which an IC component 1724 (also implemented by the music speechlet recognizer 1720) may determine corresponds to a<PlayMusic>intent. At this stage, no determination has been made as to the meaning of "mother's little helper" and "the rolling stones," but based on grammar rules and models, the NER component 1722 has determined that the text of these phrases relates to the grammatical object (i.e., entity) of the textual interpretation.

The frameworks linked to the intent are then used to determine what database fields should be searched to determine the meaning of these phrases, such as searching a user's gazetteer for similarity with the framework slots. For example, a framework for a<PlayMusic>intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, the NER component 1722 may search the database of generic words associated with the speechlet (in the knowledge base 1726). For example, if the textual interpretation was "play songs by the rolling stones," after failing to determine an album name or song name called "songs" by "the rolling stones," the NER component 1722 may search the speechlet vocabulary for the word "songs." In the alternative, generic words may be checked before the gazetteer information, or both may be tried, potentially producing two different results.

The NLU component 1554 may tag the textual interpretation to attribute meaning to the textual interpretation. For example, the NLU component 1554 may tag "play mother's little helper by the rolling stones" as: {intent}<PlayMusic>, {artist name} rolling stones, {media type} SONG, and {song title} mother's little helper. For further example, the NLU component 1554 may tag "play songs by the rolling stones" as: {intent}<PlayMusic>, {artist name} rolling stones, and {media type} SONG.

Certain recognizers 1720 may only be authorized to operate for certain users. For example, some recognizers 1720 may only be authorized to operate for adult users (e.g., users of eighteen years of age or older). The NLU component 1554 may use some combination of user recognition data 1580 user profile data to confirm the user's identity/type. Based thereon, the NLU component 1554 may determine which recognizers 1720 may operate with respect to input text data (i.e., ASR results 741).

Figure 18:
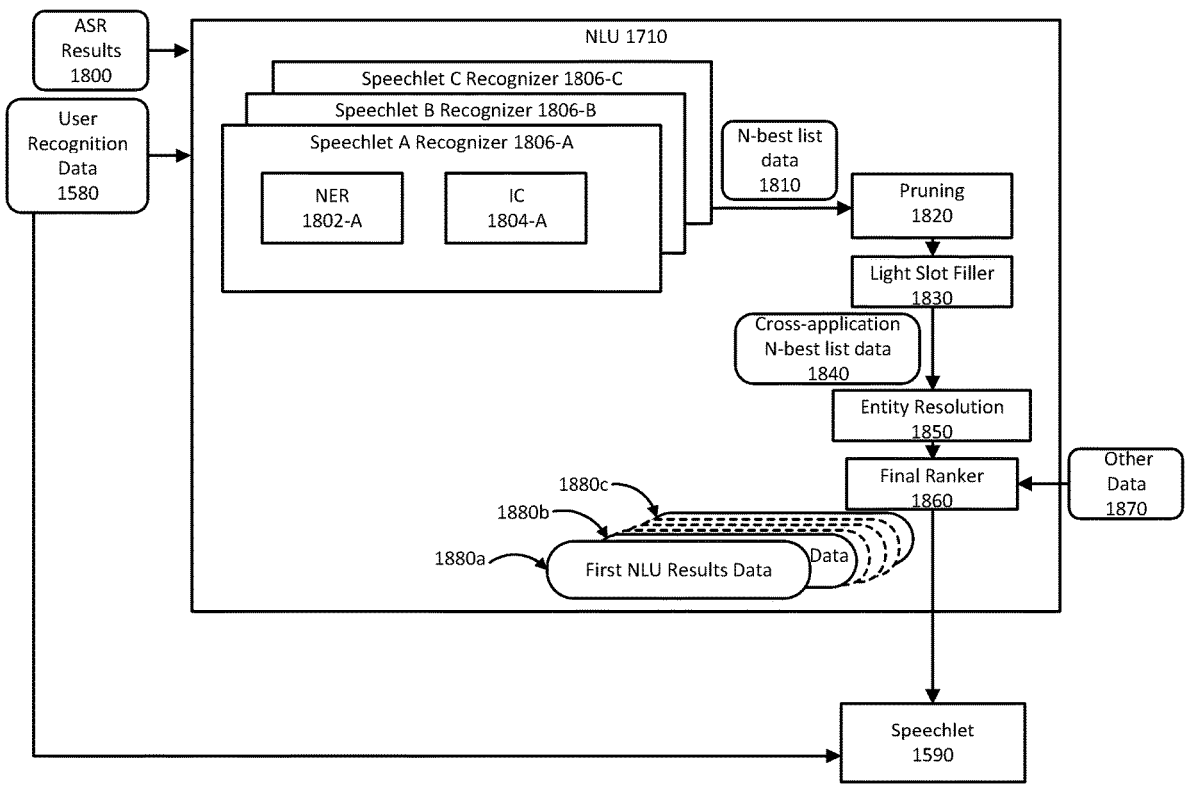

Each recognizer 1720 may output data corresponding to a single textual interpretation or to an N-best list of textual interpretations. The NLU component 1554 may compile the output data of the recognizers 1720 into a single N-best list, and may send N-best list data 1810 (representing the N-best list) to a pruning component 1820 (as illustrated in FIG. 18). The tagged textual interpretations in the N-best list data 1810 may each be associated with a respective score indicating the tagged textual interpretation corresponds to the speechlet associated with the recognizer 1720 from which the tagged textual interpretation was output. For example, the N-best list data 1810 may be represented as:

[0.95] Intent: <PlayMusic>ArtistName: Lady Gaga SongName: Poker Face

[0.70] Intent: <PlayVideo>ArtistName: Lady Gaga VideoName: Poker Face

[0.01] Intent: <PlayMusic>ArtistName: Lady Gaga AlbumName: Poker Face

[0.01] Intent: <PlayMusic>SongName: Pokerface

The pruning component 1820 creates a new, shorter N-best list (i.e., represented in N-best list data 1840 discussed below) based on the N-best list data 1810. The pruning component 1820 may sort the tagged textual interpretations represented in the N-best list data 1810 according to their respective scores.

The pruning component 1820 may perform score thresholding with respect to the N-best list data 1810. For example, the pruning component 1820 may select textual interpretations represented in the N-best list data 1810 associated with a score satisfying (e.g., meeting and/or exceeding) a score threshold. The pruning component 1820 may also or alternatively perform number of textual interpretation thresholding. For example, the pruning component 1820 may select the top scoring textual interpretation(s) associated with each different category of speechlet (e.g., music, shopping, communications, etc.) represented in the N-best list data 1810, with the new N-best list data 1840 including a total number of textual interpretations meeting or falling below a threshold number of textual interpretations. The purpose of the pruning component 1820 is to create a new list of top scoring textual interpretations so that downstream (more resource intensive) processes may only operate on the tagged textual interpretations that most likely correspond to the command input to the system.

The NLU component 1554 may also include a light slot filler component 1830. The light slot filler component 1830 can take text from slots represented in the textual interpretation(s) output by the pruning component 1820 and alter it to make the text more easily processed by downstream components. The light slot filler component 1830 may perform low latency operations that do not involve heavy operations such as reference to a knowledge base. The purpose of the light slot filler component 1830 is to replace words with other words or values that may be more easily understood by downstream components. For example, if a textual interpretation includes the word "tomorrow," the light slot filler component 1830 may replace the word "tomorrow" with an actual date for purposes of downstream processing. Similarly, the light slot filler component 1830 may replace the word "CD" with "album" or the words "compact disc." The replaced words are then included in the N-best list data 1840.

The NLU component 1554 sends the N-best list data 1840 to an entity resolution component 1850. The entity resolution component 1850 can apply rules or other instructions to standardize labels or tokens from previous stages into an intent/slot representation. The precise transformation may depend on the speechlet (e.g., for a travel speechlet, the entity resolution component 1850 may transform a text mention of "Atlanta airport" to the standard ATL three-letter code referring to the airport). The entity resolution component 1850 can refer to an authority source (e.g., a knowledge base) that is used to specifically identify the precise entity referred to in each slot of each textual interpretation represented in the N-best list data 1840. Specific intent/slot combinations may also be tied to a particular source, which may then be used to resolve the text. In the example "play songs by the stones," the entity resolution component 1850 may reference a personal music catalog, Amazon Music account, user profile 802 (described herein), or the like. The entity resolution component 1850 may output data including an altered N-best list that is based on the N-best list represented in the N-best list data 1840, but also includes more detailed information (e.g., entity IDs) about the specific entities mentioned in the slots and/or more detailed slot data that can eventually be used by a speechlet(s) 1590 which may be incorporated into the server(s) 1540 components or pipeline or may be on a separate device(s) (e.g., a skill server(s) 1540) in communication with the server(s) 1540. The NLU component 1554 may include multiple entity resolution components 1850 and each entity resolution component 1850 may be specific to one or more speechlets.

The entity resolution component 1850 may not be successful in resolving every entity and filling every slot represented in the N-best list represented in the N-best list data 1840. This may result in the entity resolution component 1850 outputting incomplete results. The NLU component 1554 may include a final ranker component 1860, which may consider such errors when determining how to rank the tagged textual interpretations for potential execution. For example, if a book speechlet recognizer 1720 outputs a tagged textual interpretation including a <ReadBook>intent flag, but the entity resolution component 1850 cannot find a book with a title matching the text of the item, the final ranker component 1860 may re-score that particular tagged textual interpretation to be given a lower score. The final ranker component 1860 may also assign a particular confidence to each tagged textual interpretation input therein. The confidence score of a particular tagged textual interpretation may be affected by whether the tagged textual interpretation has unfilled slots. For example, if a tagged textual interpretation associated with a first speechlet includes slots that are all filled/resolved, that tagged textual interpretation may be associated with a higher confidence than another tagged textual interpretation including at least some slots that are unfilled/unresolved.

The final ranker component 1860 may apply re-scoring, biasing, or other techniques to obtain the most preferred tagged and resolved textual interpretation. To do so, the final ranker component 1860 may consider not only the data output by the entity resolution component 1850, but may also consider other data 1870. The other data 1870 may include a variety of information. For example, the other data 1870 may include speechlet rating or popularity data. For example, if one speechlet has a particularly high rating, the final ranker component 1860 may increase the score of a textual interpretation(s) associated with or otherwise invoking that particular speechlet. The other data 1870 may also include information about speechlets that have been specifically enabled by the user. For example, the final ranker component 1860 may assign higher scores to textual interpretations associated with or otherwise invoking enabled speechlets than textual interpretations associated with or otherwise invoking non-enabled speechlets. User history may also be considered, such as if the user regularly uses a particular speechlet or does so at particular times of day. Date, time, location, weather, type of device 1510, user ID, context, and other information may also be considered. For example, the final ranker component 1860 may consider when any particular speechlets are currently active (e.g., music being played, a game being played, etc.).

Following final ranking, the NLU component 1554 may output NLU output data 1880. The NLU component 1554 may send the NLU output data 1880 to the orchestrator component 1570, which sends the NLU output data 1880 to an appropriate speechlet 1590 or skill server(s) 1540 (e.g., one configured to execute a command based on the textual interpretation represented in the NLU output data 1880). The NLU output data 1880 may include an indicator of the intent of the textual interpretation along with data associated with the intent, for example an indication that the intent is <PlayMusic> and the music to be played is "Adele." Multiple instances of NLU output data (e.g., 1880a-1880n) may be output for a given set of text data input into the NLU component 1554.

The speechlet(s) 1590/skill server(s) 1540 provides the server(s) 1540 with data responsive to the NLU output data 1880 received thereby. If the data is text data that needs to be converted to computerized speech, the orchestrator component 1570 sends the text data to the TTS component 1592.

User recognition data 1580 may also be used by the NLU component 1554 and/or the speechlet 1590/skill server(s) 1540 to ensure that any user specific commands are properly interpreted and executed.

A user identified using techniques described herein may be associated with a user identifier (ID), user profile, or other information known about the user by the system. As part of the user recognition techniques described herein, the system may determine the user identifier, user profile, or other such information. The profile storage 1572 may include data corresponding to profiles that may be used by the system to perform speech processing. Such profiles may include a user profile that links various data about a user such as user preferences, user owned devices, address information, contacts, enabled speechlets, payment information, etc. Each user profile may be associated with a different user ID. A profile may be an umbrella profile specific to a group of users. That is, a user profile may encompass two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device ID, location, owner entity, whether the device is in a public, semi-public, or private location (which may be indicated by a public and/or semi-public flag), device capabilities, device hardware, or the like.

A profile may also be an entity profile, for example belonging to a business, organization, or other non-user entity. Such an entity profile may include information that may otherwise be found in a user and/or device profile, only such information is associated with the entity. The entity profile may include information regarding which users and/or devices are associated with the entity.

Figure 19:
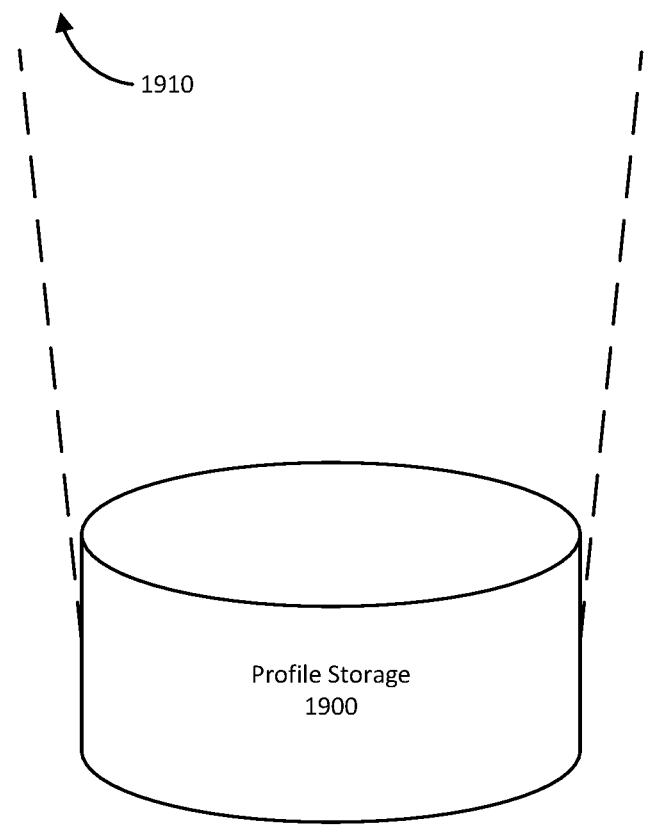
FIG. 19 illustrates data stored and associated with profiles according to embodiments of the present disclosure.

For example, as illustrated in FIG. 19, a group profile 1900 may include information about users, devices, and locations of the devices. In the example illustrated, the group profile 1900 is associated with a home and lists four devices: one device in a living room, one device in a kitchen, one device in a den/office, and one device in a bedroom. Various other information may also be stored and/or associated with a profile.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example of programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, that a device is coupled to a charging device;
   determining that being coupled to the charging device triggers activation of a first operation mode at the device;
   causing the device to activate the first operation mode, wherein the first operation mode includes a locked state preventing access to information associated with an application and a listening state for receiving user input data;
   receiving first input data indicative of a request for the information associated with the application;
   authorizing access to the information based on voice identification of a user using the first input data; and
   presenting at least a portion of the information on the display of the device while in the locked state.

2. The method of claim 1, further comprising:
   determining completion of a handshake protocol with the charging device; and
   identifying the charging device as a known charging device based at least in part on the completion of the handshake protocol.

3. The method of claim 2, wherein coupling to the known charging device causes an automatic activation of the first operation mode at the device.

4. The method of claim 1, wherein determining that being coupled to the charging device triggers activation of the first operation mode at the device comprises determining that being coupled to the charging device triggers activation of a voice-forward operation mode at the device.

5. The method of claim 1, further comprising:
   presenting a first home screen user interface associated with the first operation mode prior to receiving the first input data; and
   presenting a second home screen user interface associated with the application.

6. The method of claim 1, wherein determining that the device is coupled to the charging device comprises determining that a battery of the device is being charged.

7. The method of claim 1, wherein determining that the device is coupled to the charging device comprises determining that the device is coupled to a dock-based charging device.

8. The method of claim 1, further comprising:
   determining a reformatted application interface corresponding to the application for presentation in the first operation mode; and
   presenting the reformatted application interface.

9. The method of claim 1, further comprising:
   receiving second input data indicative of a request to open the application;
   requesting permission to enable a version of the application;
   causing enablement of the version of the application; and
   causing the version of the application to be opened.

10. The method of claim 1, further comprising:
    receiving second input data indicative of a request to open the application;
    determining that an available version of the application is for a second operation mode;
    causing the device to change the device operation mode to the second operation mode; and
    causing the application to be opened.

11. The method of claim 1, further comprising:
    receiving a message representing a command to activate a second operation mode.

12. A device comprising:
    memory that stores computer-executable instructions; and
    at least one processor configured to access the memory and execute the computer-executable instructions to:
      determine that the device is coupled to a charging device;
      determine that being coupled to the charging device triggers activation of a first operation mode at the device, wherein the first operation mode includes a locked state preventing access to information associated with an application and a listening state for receiving user input data;
      cause the device to activate the first operation mode;
      receive first input data indicative of a request for information associated with an application;
      authorizing access to the information based on voice identification of a user using the first input data; and
      present at least a portion of the information on the display of the device while in the locked state.

13. The device of claim 12, wherein the at least one processor is further configured to access the memory and execute the computer-executable instructions to:
    determine completion of a handshake protocol with the charging device; and
    identify the charging device as a known charging device based at least in part on the completion of the handshake protocol.

14. The device of claim 13, wherein coupling to the known charging device causes an automatic activation of the first operation mode at the device.

15. The device of claim 12, wherein the at least one processor is configured to determine that being coupled to the charging device triggers activation of the first operation mode by executing the computer-executable instructions to:
    determine that being coupled to the charging device triggers activation of a voice-forward operation mode at the device.

16. The device of claim 12, wherein the at least one processor is further configured to access the memory and execute the computer-executable instructions to:
    present a first home screen user interface associated with the first operation mode prior to receiving the first input data; and
    present a second home screen user interface associated with the application.

17. The device of claim 12, wherein the at least one processor is configured to determine that the device is coupled to the charging device by executing the computer-executable instructions to:
    determine that a battery of the device is being charged.

18. The device of claim 12, wherein the at least one processor is configured to determine that the device is coupled to the charging device by executing the computer-executable instructions to:
    determine that the device is coupled to a dock-based charging device.

19. The device of claim 12, wherein the at least one processor is further configured to access the memory and execute the computer-executable instructions to:
    present an application interface of the application in the second operation mode;
    determine a reformatted application interface corresponding to the application for presentation in the first operation mode; and
    present the reformatted application interface.

20. The device of claim 12, wherein the at least one processor is further configured to access the memory and execute the computer-executable instructions to:
    receive second input data indicative of a request to open the application;
    determine that an available version of the application is for the second operation mode;
    cause the device to change the device operation mode to the second operation mode; and
    cause the application to be opened.

\* \* \* \* \*